(12) United States Patent
Spater et al.

(10) Patent No.: US 7,669,907 B2
(45) Date of Patent: Mar. 2, 2010

(54) SEAT PARTITIONS FOR A VEHICLE AND METHODS OF USE THEREOF

(75) Inventors: Gordon C. Spater, Boxford, MA (US); Christopher B. Spater, Portsmouth, NH (US); Ryan C. Meers, Redland Bead, CA (US)

(73) Assignee: Motivation Design, LLC, Salisbury, MA (US)

( * ) Notice: Subject to any disclaimer, the term of this patent is extended or adjusted under 35 U.S.C. 154(b) by 558 days.

(21) Appl. No.: 11/163,656

(22) Filed: Oct. 26, 2005

(65) Prior Publication Data

US 2006/0103155 A1  May 18, 2006

Related U.S. Application Data

(60) Provisional application No. 60/623,417, filed on Oct. 29, 2004.

(51) Int. Cl.
*B60R 99/00* (2006.01)
(52) U.S. Cl. .................................................. 296/24.46
(58) Field of Classification Search ............... 296/24.3, 296/24.31, 24.4, 24.43, 24.46
See application file for complete search history.

(56) References Cited

U.S. PATENT DOCUMENTS

| | | | | |
|---|---|---|---|---|
| 4,708,384 | A * | 11/1987 | LaRosa | .................... 296/24.46 |
| 4,803,951 | A | 2/1989 | Davis | |
| 4,854,364 | A | 8/1989 | Junker | |
| 4,924,814 | A | 5/1990 | Beaudet | |
| 4,943,105 | A * | 7/1990 | Kacar et al. | .................. 280/749 |
| 4,960,293 | A * | 10/1990 | Bottinick et al. | ............ 280/749 |
| 5,054,837 | A * | 10/1991 | Chapman | ................... 296/24.4 |
| 5,474,329 | A | 12/1995 | Wade et al. | |
| 5,479,892 | A | 1/1996 | Edwards | |
| 5,529,341 | A * | 6/1996 | Hartigan | .................... 280/749 |
| D393,622 | S | 4/1998 | Goertzen | |
| 5,848,817 | A * | 12/1998 | Niehaus | ................... 296/24.46 |
| 6,012,753 | A | 1/2000 | Ordoyne et al. | |
| 6,089,659 | A * | 7/2000 | Toyota | .................. 297/228.11 |
| 6,250,700 | B1 * | 6/2001 | Traxler | .................... 296/24.46 |
| 6,260,903 | B1 | 7/2001 | von der Heyde | |
| 6,374,776 | B2 | 4/2002 | Adair et al. | |
| 6,502,859 | B1 * | 1/2003 | Svetlik | ....................... 280/749 |

(Continued)

FOREIGN PATENT DOCUMENTS

EP    0 647 547 A2    4/1995

(Continued)

*Primary Examiner*—Hilary Gutman
(74) *Attorney, Agent, or Firm*—Antoinette G. Giugliano PC

(57) ABSTRACT

The present invention pertains to an apparatus for partitioning seats in a vehicle. In one embodiment, the apparatus has a first partition for separating the back row of seats from the front row of seat in a vehicle; and at least one mounting member for securing the partition to the front row seat. The present invention also relates to an apparatus for partitioning a seat from an adjoining seat, and further includes a second partition, attached to the first partition, and at least one mounting member attaching the second partition to the backseat. The present invention also includes methods for separating or partitioning pets, children, groceries, etc. from adjoining seats of a vehicle by using the apparatus described herein. Also embodied are systems, vehicles and kits that include the apparatus.

17 Claims, 20 Drawing Sheets

U.S. PATENT DOCUMENTS

| | | |
|---|---|---|
| D473,838 S | 4/2003 | Wang |
| 6,591,787 B1 | 7/2003 | Gantz |
| 6,742,837 B1 * | 6/2004 | Alexander ............. 297/188.21 |
| 6,827,382 B2 * | 12/2004 | Murray et al. ........... 296/24.46 |
| 6,962,382 B2 * | 11/2005 | Scarlett ................... 296/24.46 |
| 6,983,969 B2 * | 1/2006 | Murray et al. ............. 296/24.4 |
| 7,261,375 B2 * | 8/2007 | Godshaw et al. ....... 297/228.12 |
| 2001/0042516 A1 | 11/2001 | Wright |
| 2002/0180229 A1 * | 12/2002 | Wheat ....................... 296/24.1 |
| 2003/0200937 A1 | 10/2003 | Muckleroy |
| 2004/0182329 A1 | 9/2004 | Kroculick |
| 2004/0232719 A1 | 11/2004 | Scarlett |
| 2005/0151388 A1 | 7/2005 | Wang |
| 2007/0176450 A1 * | 8/2007 | Setina ..................... 296/24.46 |

FOREIGN PATENT DOCUMENTS

| | | |
|---|---|---|
| EP | 1 369 311 A1 | 10/2003 |
| JP | 20000025530 | 1/2000 |
| JP | 2000-255355 | 9/2000 |
| JP | 2001138796 | 5/2001 |
| WO | WO 99/47391 A1 | 9/1999 |
| WO | WO 03/057530 A2 | 7/2003 |

* cited by examiner

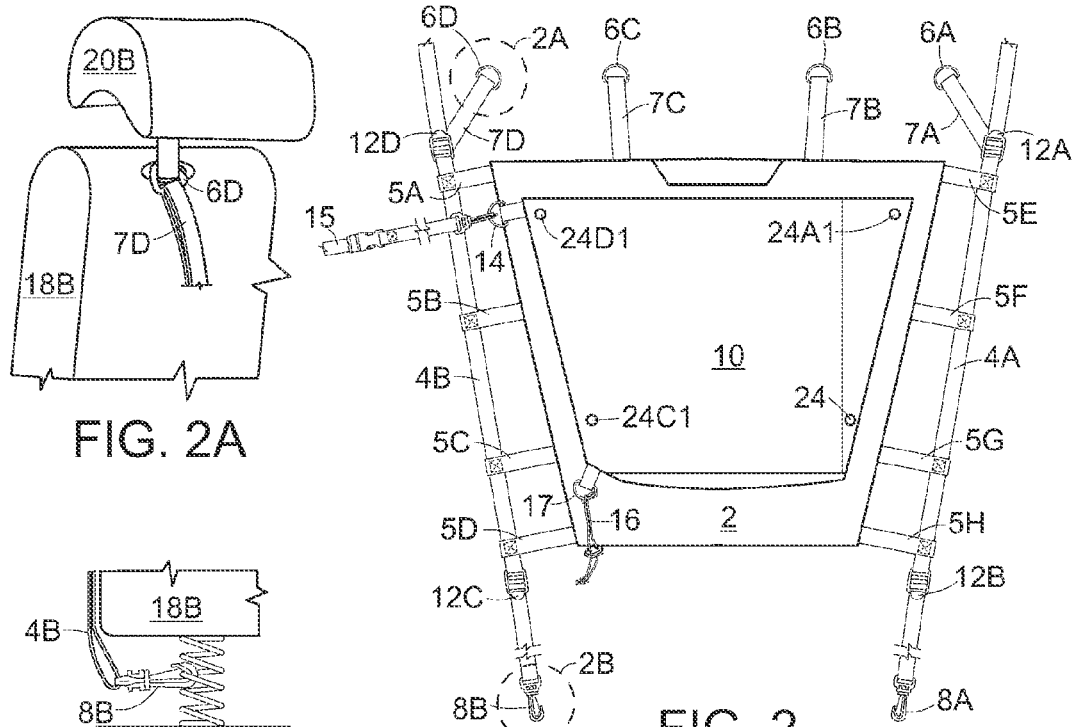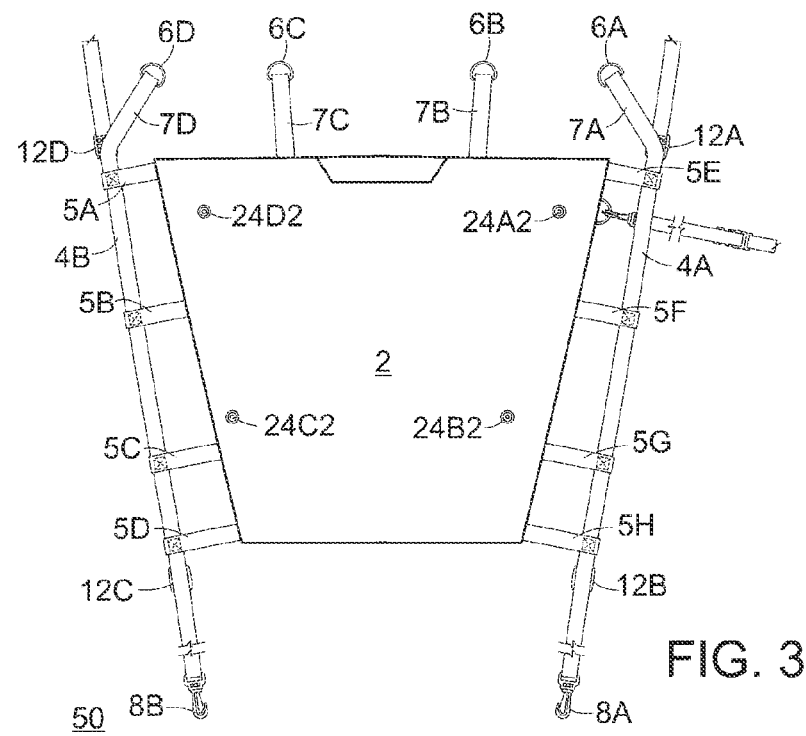

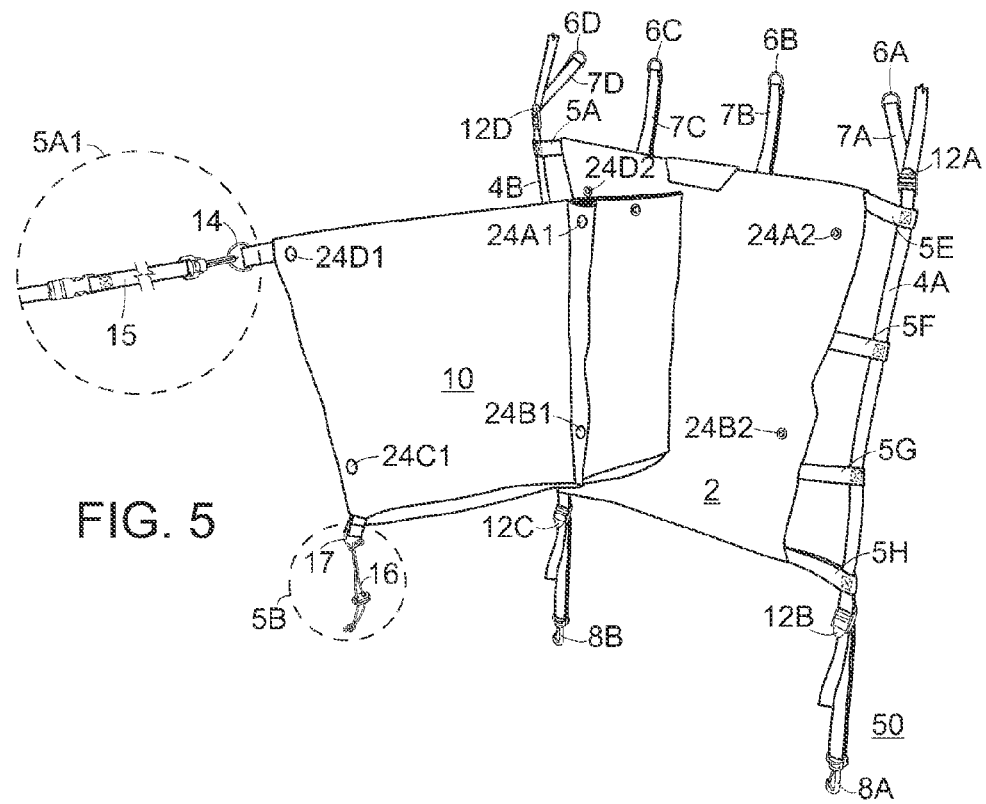
FIG. 5
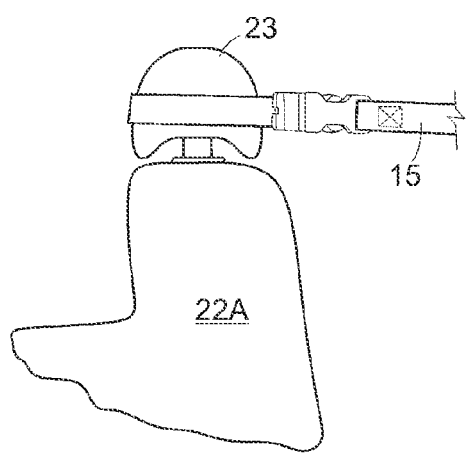
FIG. 5A1
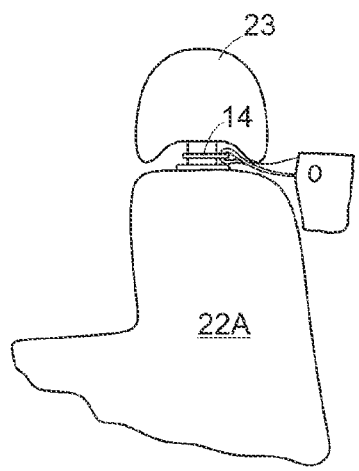
FIG. 5A2
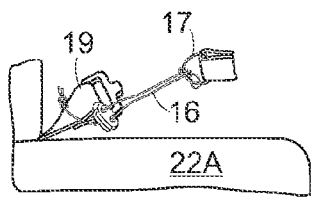
FIG. 5B

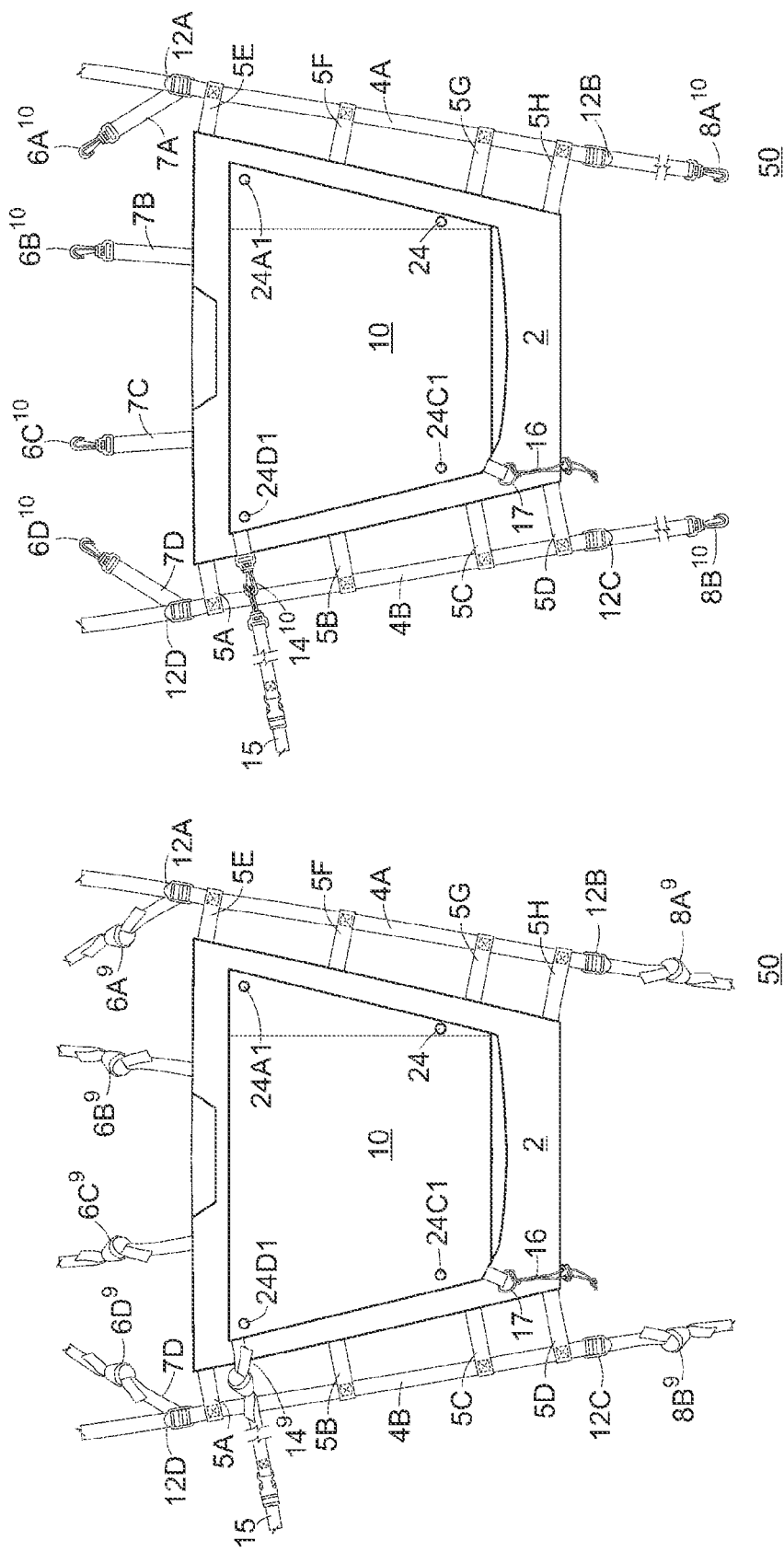

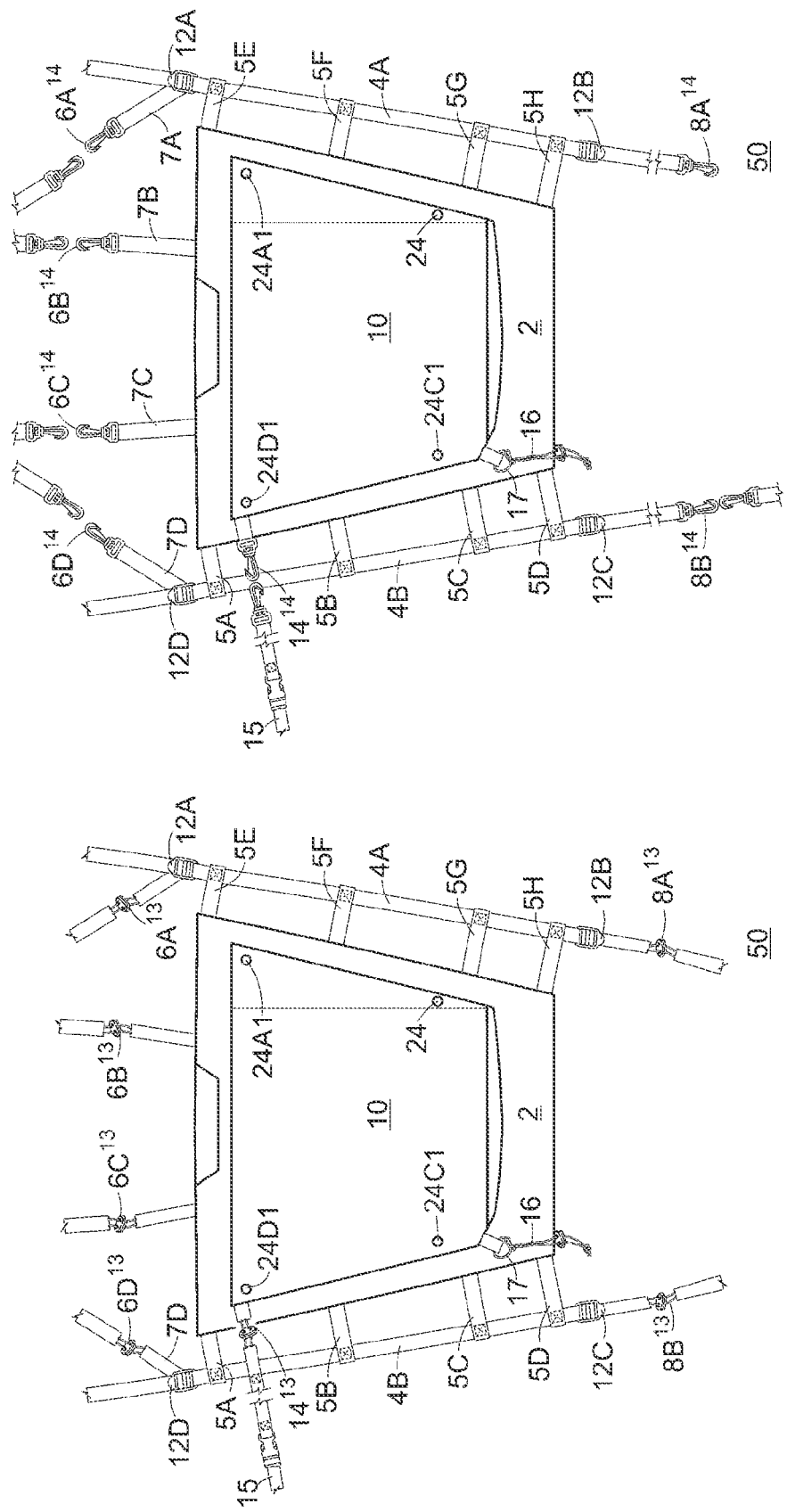

SEAT PARTITIONS FOR A VEHICLE AND METHODS OF USE THEREOF

RELATED APPLICATION

This application claims the benefit of U.S. Provisional Application No. 60/623,417, filed Oct. 29, 2004. The entire teachings of the above application are incorporated herein by reference.

BACKGROUND OF THE INVENTION

Pets or children moving around freely in cars are a safety hazard to themselves and the passengers. If the driver slams on the brakes, the pet or child could launch into the front seat and cause injury to the pet. A pet or child that moves around a vehicle can distract the driver, and/or get pet hair on the front seats.

A need exists to design a barrier to prevent pets or children from moving back and forth between the back seat and front seat. A further need exists to design a barrier that also separates the pet or child from passengers that are sitting in an adjoining seat.

SUMMARY OF THE INVENTION

The present invention relates to an apparatus (e.g., a barrier) for partitioning seats in a vehicle. The apparatus has a first partition for separating a second row (e.g., any row having a row ahead of it) from a first row (e.g., any row having a row behind it). The apparatus also has at least one (e.g., about 1, 2, 3, 4, or more) first mounting member for mounting the first partition to the first row of seats or a top region thereof, wherein the first partition has at least one first mounting member. The present invention further encompasses a second partition for separating a first seat in the second row from a second seat in the second row (e.g., an adjoining seat), wherein the second partition attaches at an angle to a portion of the first partition. The apparatus of the present invention also includes at least one (e.g., about 1, 2, 3, 4, or more) second mounting member for mounting the second partition to the second row of seats or a top region thereof, wherein the second partition has at least one second mounting member. In an embodiment, the apparatus includes one or more materials that allow for the adaptation or adjustment of the length or width of the apparatus, the first partition, and/or the second partition. The adjustable material can be elastic material, a spandex material, a spring, a pulley, a blend thereof, or combination thereof. Additionally, each of the mounting members, or straps attached thereto can be adjustable and/or flexible. One or more of the mounting members include a ring (D-ring), a loop, a hook, a snap, a fastener, a strap, a buckle, a trap-lock, a button, a strap, an elastic member, a tie, a clip, a zipper, a drawstring & cord lock, a hook & hook arrangement, a ring and strap arrangement, a hook & loop arrangement, or a combination thereof. In an embodiment, the first mounting members are members that are secured to two pins of two headrests in the first row of seats, or to wrap around the headrest, and the second mounting member further comprises a member that is secured to a pin of one headrest in the second row of seats. The present invention includes an apparatus that encompasses one or more first securing members for securing the first partition under the first row of seats, and one or more second securing members for securing the second partition to a seat belt stem, back headrest, Velcro®-type fasteners to the back of the seat, to the seat release knob, pressure mount bar, or child safety latch in the second row of seats. The first securing member, the second securing member, or both, in one embodiment, are adjustable and/or flexible. The securing members can be, e.g., a ring, a loop, a hook, a snap, a fastener, a strap, a buckle, a trap-lock, a button, a hook, a strap, an elastic member, a tie, a clip, a zipper, a drawstring & cord lock, a hook & hook arrangement, a ring and strap arrangement, the male end of a seat belt, a hook & loop/strap arrangement, or a combination thereof. The second partition attaches, in some embodiments, to a portion of the first partition with a seam, snaps, zipper, fasteners, hooks & loop arrangement, knot, lacing, or combination thereof.

In an embodiment, the apparatus of the present invention pertains to a first partition for separating a second row from a first row of seats in the vehicle; at least one mounting strap having a first end and a second end, wherein at least one side of the first partition has the mounting strap; and at least one first mounting member for mounting the first partition to the first row of seats or a top region thereof, wherein the first end of the mounting strap has the first mounting member. In an embodiment, the apparatus can also have at least one first securing member for securing the first partition to a structure under the first row of seats, wherein the second end of the mounting strap has the first securing member. In yet another embodiment, the apparatus can further include a second partition for separating a first seat in the second row from a second seat in the second row, wherein the second partition attaches at an angle to a portion of the first partition; and at least one second mounting member for mounting the second partition to the second row of seats or a top region thereof, wherein the second end of the mounting strap has at least one second mounting member. An embodiment of the apparatus also includes a device for housing, or folding back the second partition. The device for housing or folding back the second partition includes a snap, pocket, zipper, hook & loop arrangement, a fastener, a buckle, a button, a tie, a clip, or any combination thereof.

Methods for separating (e.g., partitioning) a pet or child in a first seat in a row of a vehicle from a second seat in the same row are also encompassed by the present invention. The methods include securing the pet or child in a seat for which the apparatus of the present invention, as described herein, has been installed. The method and apparatus of the present invention also aid to protect groceries, multiple children, multiple pets from one another.

Methods of installing the apparatus of the present invention include mounting the first partition to the first row of seats or a top region thereof using said first mounting members; and mounting the second partition with one or more second mounting members to the second row of seats or a top region thereof using said second mounting members. The methods can also include securing the first securing members under the first row of seats, or securing the second securing members to a seat belt stem or child safety latch in the second row of seats. One can also adjust the first mounting member, the second mounting member, the first securing member, the second securing member, or any combination thereof.

The present invention includes vehicle partitioning systems, having a vehicle with a first row of seats and a second row of seats; and the apparatus described herein. Along with systems, the present invention relates to kits for partitioning seats in a vehicle. Kits can include elements or combination of elements of the apparatus, as described herein that are put together by the user and/or one or more pet related items. The present invention also includes a vehicle having at least two rows of seats; and the apparatus described herein.

Advantages of the present invention include protecting pets from launching forward when breaking; protecting passengers and cargo in the backseat from roaming pets; and driving more safely with the pet or child in the backseat. An additional advantage includes protection of goods in the other parts of the car. The barrier of the present invention does not require removal when passengers or goods travel in the car, thereby providing flexibility for the user.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a drawing showing a frontal view an embodiment of the barrier of the present invention.

FIG. 2A is a drawing showing one embodiment of a first mounting member being attached to a headrest pin.

FIG. 2B is a drawing showing an embodiment of a first securing member being attached to a spring underneath a vehicle seat.

FIG. 3 is a drawing of a back view of an embodiment of the barrier of the present invention.

FIG. 5 is a drawing of a perspective view of an embodiment of the present invention showing the first and second partition.

FIG. 5A1 is a drawing showing an embodiment of a second mounting member being secured to a headrest in the back seat of a vehicle.

FIG. 5A2 is a drawing showing another embodiments of another second mounting member being attached to a headrest pin of the seat.

FIG. 5B is a drawing showing an embodiment of a second securing member being mounted to a seatbelt stem.

DETAILED DESCRIPTION OF THE INVENTION

A description of preferred embodiments of the invention follows.

Figure 1:
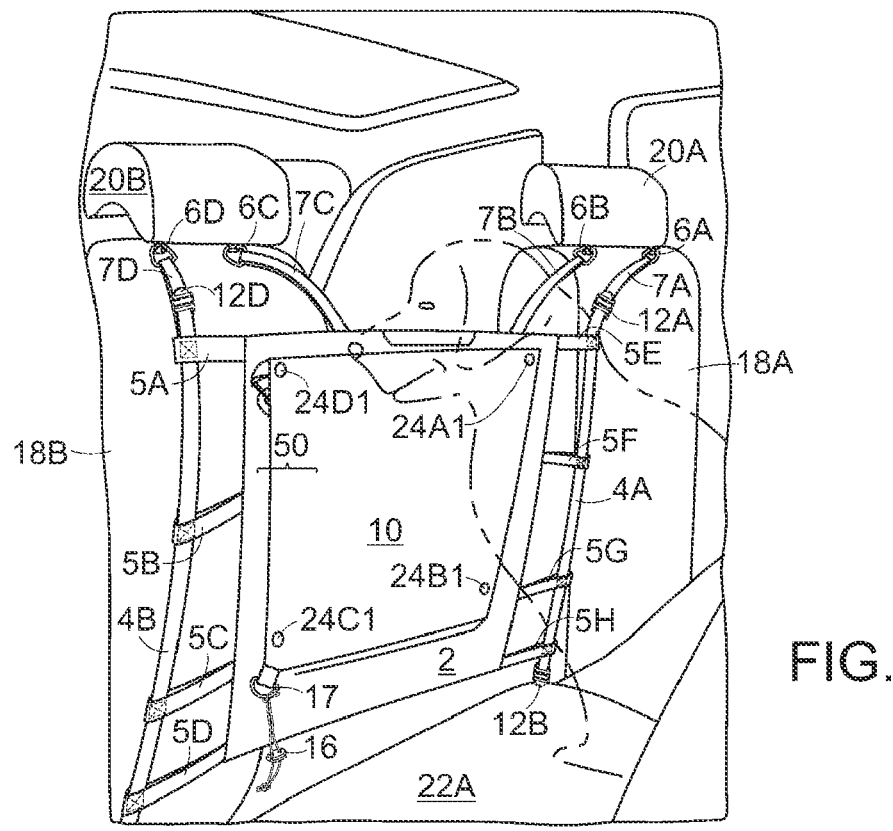
FIG. 1 is a drawing showing, in one embodiment, the first partition mounted to the headrests in the front row of the vehicle.
Figure 9A:
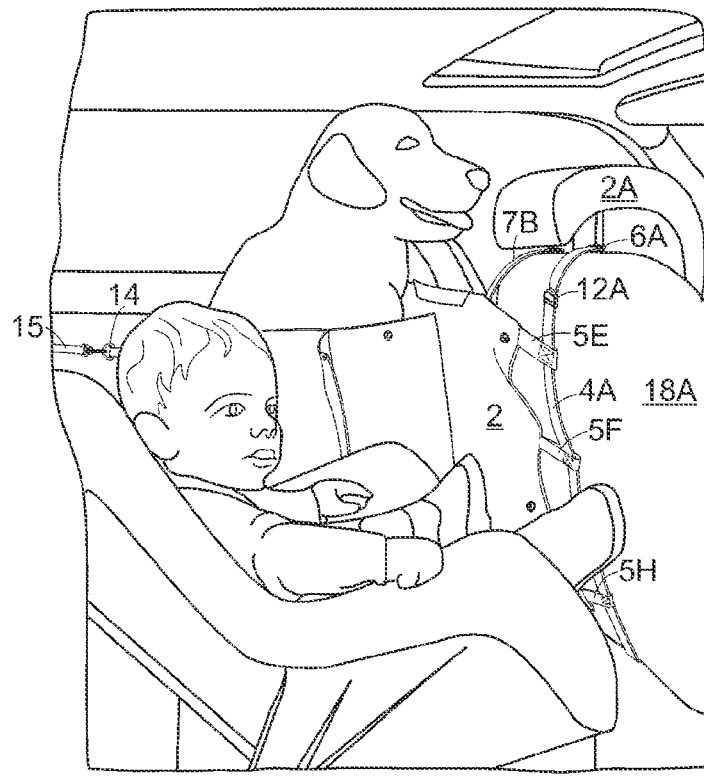
FIGS. 9A-9B are drawings showing the baffler of the present invention used to separate a child and a pet (FIG. 9A), and used to separate a person and groceries (FIG. 9B).
Figure 9B:
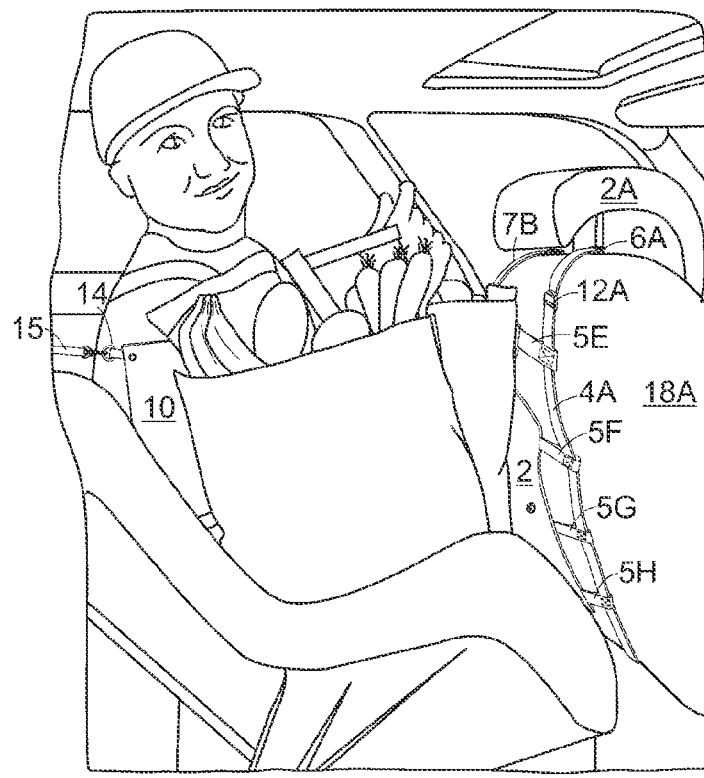

The present invention relates to a barrier or partition that keeps pets or children from moving to the front seat and/or to the adjoining seat in a vehicle. The barrier of the present invention also serves to protect groceries and multiple children or pets from one another See FIGS. 9A-B). Referring to FIG. 1, an embodiment of the invention includes apparatus 50 for partitioning seats in a vehicle and includes first partition 2 for separating the back row of seats from the front row of seats. The first partition is large enough to block the pet or child from moving between a second row of seats (e.g., back row or third row) into a first row of seats (e.g., front row, or middle row of a three-row vehicle).

Although the partitions are stiff to prevent the pet or child from sliding under the partition, it is also flexible in allowing the seat to move forward and backward while maintaining the integrity of the partition. As such, the first partition includes in an embodiment at least two portions, an adjustable portion and non-adjustable portion. As shown in FIGS. 2 and 3, first partition 2 includes mounting straps 4A and 4B and elastic members 5A-5H. They allow for first partition 2 to universally fit many size vehicles, and also allow for seats 18A and 18B to be put in different seating positions. Seats can move from one position to another without the user having to disengage and re-install the barrier of the present invention. Mounting straps and elastic members (e.g., mounting system) of the present invention provide a universal fit by providing movement or a stretch in essentially horizontal and essentially vertical directions, when viewing the first partition as installed on the back of a row of seats in a vehicle. For example, elastic members 5A-H stretch essentially in a horizontal direction. Mounting strap 4B also has adjustable buckles 12C and 12D to allow for adjustment in essentially a vertical direction. The advantage of having non-adjustable material in combination with adjustable material is that the partition is strong enough to prevent a pet or child from going into the row ahead of it, while still allowing for a universal fit in various types and sizes of vehicles and for seat placement in various seat positions.

The adjustable portion of the first partition can be of any combination of materials and straps so long as the adjustable portion allows stretch or movement of the partition. Adjusting refers to changing the length, width or size of an article. In an embodiment, the partition allows for movement or adjustment in essentially both the horizontal and vertical directions. For example, the adjustable portion can comprise one or more elastic members or bungee cords (e.g., about 2, 3, 4, 5, 6, or more), one or more adjustable straps (e.g., about 1, 2, 3, 4, 5, 6, or more), various fabrics that stretch (e.g., mesh, spandex, or the like), or any combination thereof. In an embodiment, the adjustable portion includes mounting straps that have a combination of a plurality of elastic straps and plurality of adjustable straps.

The first partition has a width and height (i.e., length) that are large enough to prevent a pet or child to pass to the row of seats ahead of them, when installed. In one embodiment, the first partition, including both the adjustable and non-adjustable portions, has a width that is greater at the top and tapers to a lesser width at the bottom. See FIGS. 1, 2, and 3. This tapered design accommodates the shape of the space between bucket seats in most vehicles. However, the shape of the first partition can be any shape to accommodate various shaped seats. In a preferred embodiment as shown in FIG. 1, the first partition overlaps the space between the seats of the row to which it is installed. Overlapping the space between the seats allows for a more secure barrier. The first partition, in an embodiment, has a length that prevents a pet or child from scooting under or climbing over the barrier. The first partition, in an embodiment, has a width in a range between about 6 inches and about 60 inches, and a height in a range between about 12 inches and about 72 inches.

The material to construct the non-adjustable portion of first partition, and the second partition as described further herein, refers to material that is strong enough, that when installed, prevents the pet or child from moving into the front row (first partition), or into the adjoining seat (second partition), respectively. In an embodiment, the material is strong and flexible. Materials that are now known and/or commercially available can be used. Examples of materials that can be used to construct the first or second partitions include nylon, synthetic fabrics, organic fabrics, or plastic sheet materials. These materials can be obtained from a number of distributors including, e.g., American Home & Habitat, Squires, Mo. (www.americanhomeandhabitat.com). Materials for the non-adjustable portion can also be made from wood, hard plastic, metal, and the like. Materials developed in the future can also be used provided that the material that is strong enough, that when installed, to secure the pet or child in the seat.

Figure 8B:
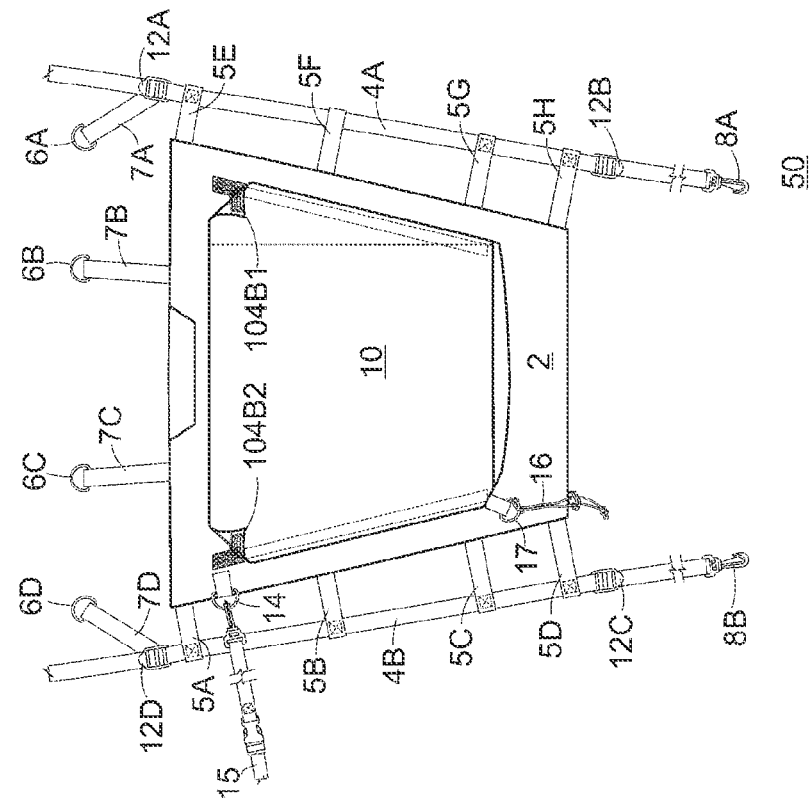
FIGS. 8A-8E are drawings showing a frontal view in which the second partition is folded away using a zipper (FIG. 8A), a hook & loop arrangement (FIG. 8B), knots (FIG. 8C), lacing (FIG. 8D) and a combination thereof (FIG. 8E).
Figure 8A:
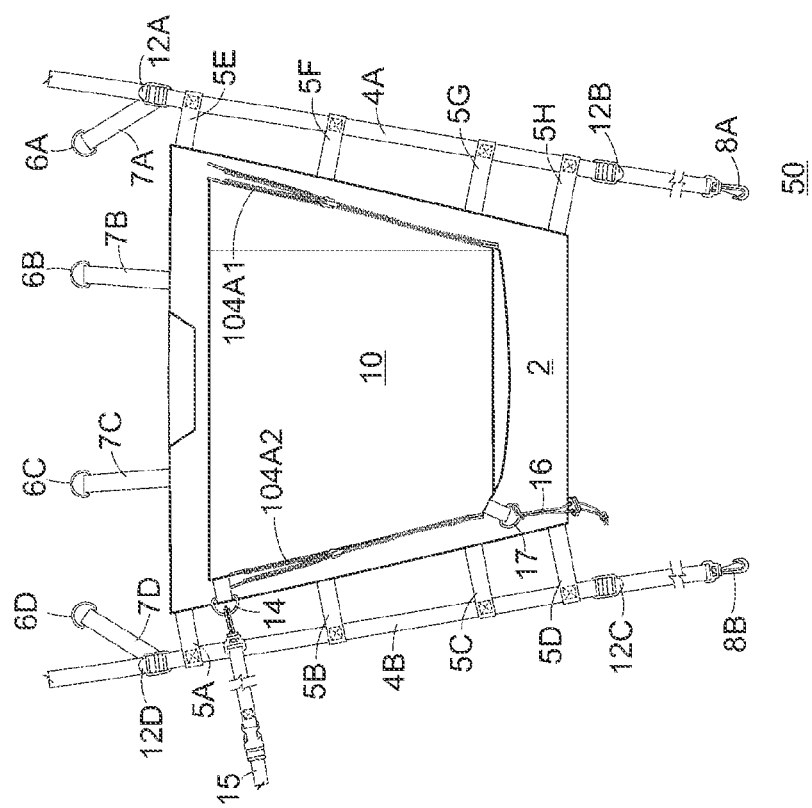
Figure 8D:
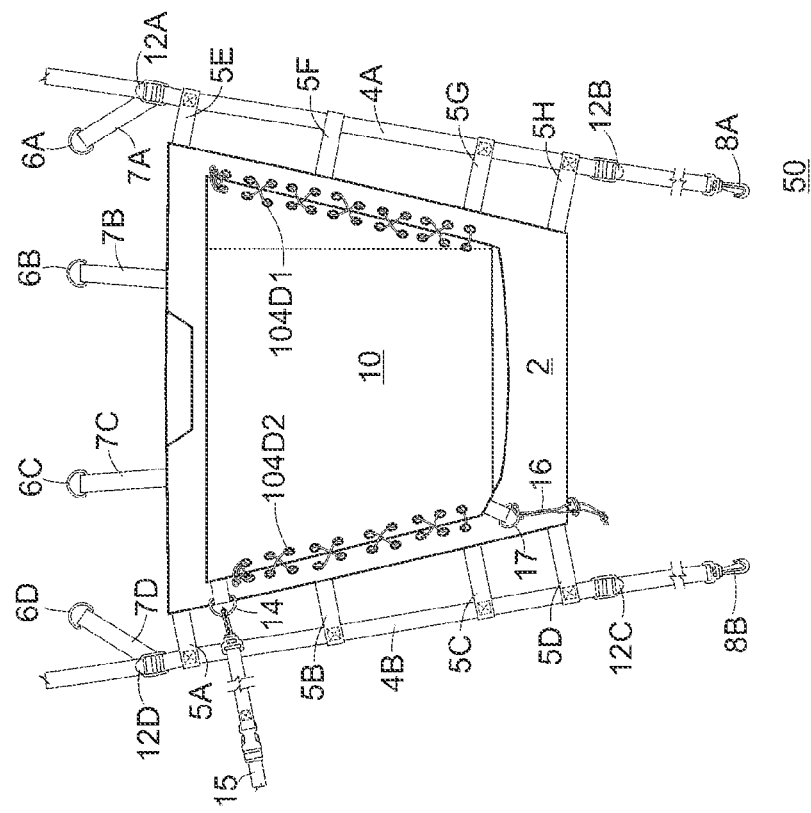
Figure 8C:
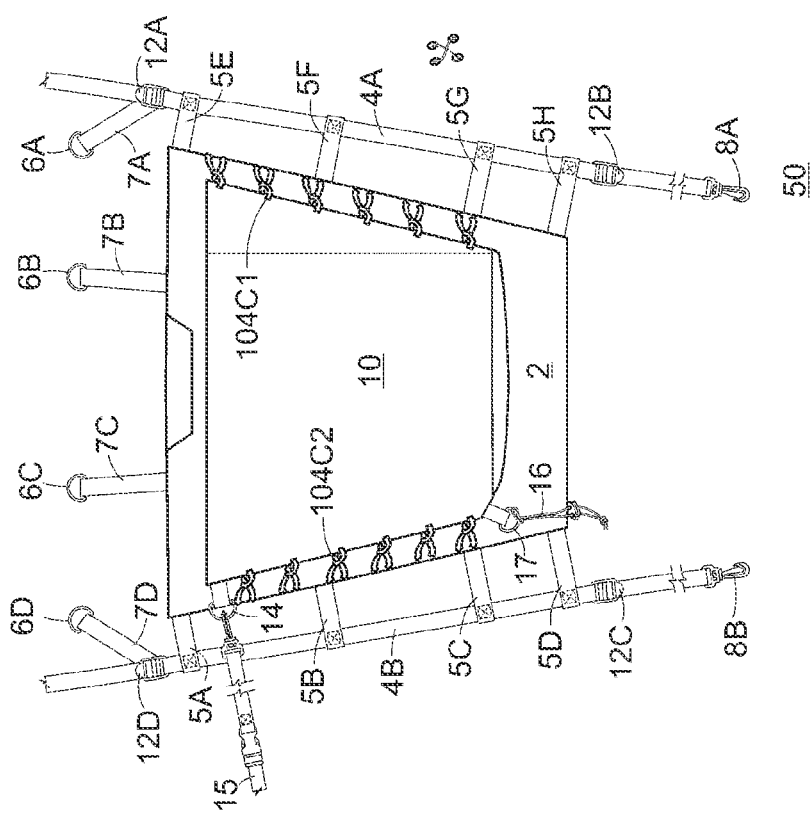
Figure 8E:
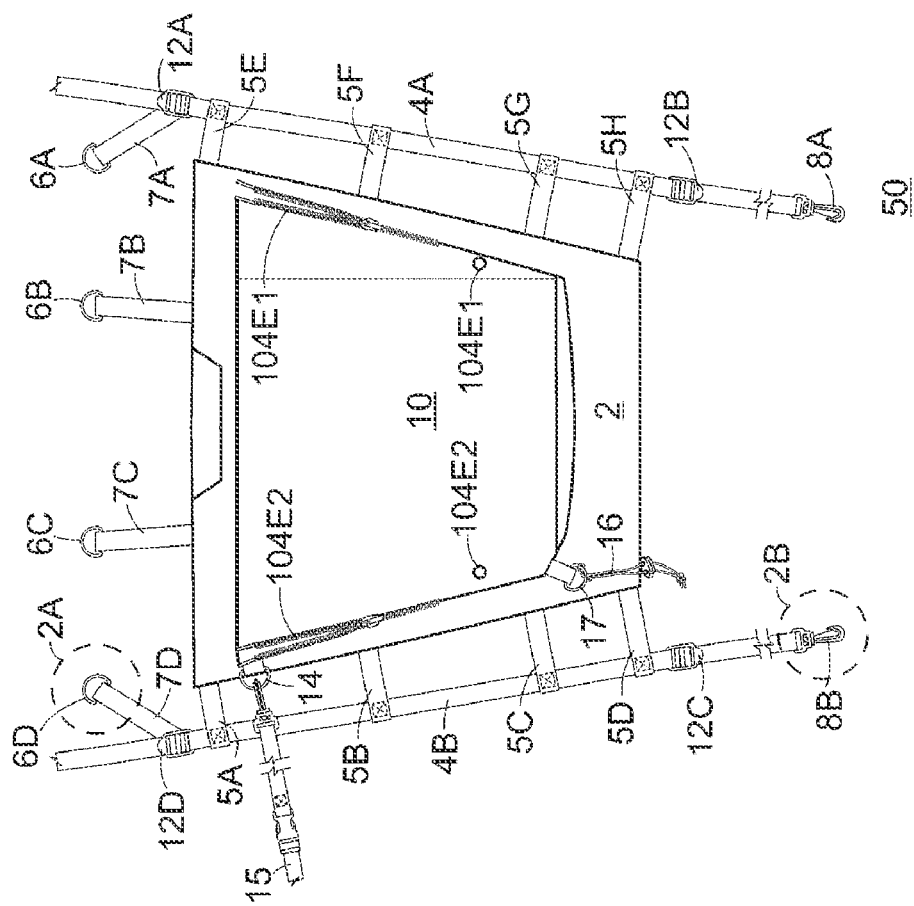

The first partition also has a device that allows one to fold or tuck away the second partition, when the second partition is not in use. FIG. 2 shows second partition 10 sitting flat against first partition 2. Snaps are shown in the figure. The male portion 24A2-24D2 of the snaps are on second partition 10 (FIG. 3), and receiving portion 24A1-24D1 of the snap is on first partition 2 (FIG. 2). Snaps 24A-D are positioned such that when snapped in place, second partition 10 is folded and out of the way when the user desires only to use first partition 2. In addition to snaps, several types of devices that can be used to fold, hold, or house the second partition. Such devices include, e.g., snaps, pockets, zippers (See zippers 104A1 and 104A2 of FIG. 8A), fasteners, hooks & loop arrangements (See hook and loop fasteners 104B1 and 104B2 of FIG. 8B), buckles, buttons, ties (See ties 104C1 and 104C2 of FIG. 8C), lace (See lace 104D1 104D2 of FIG. 8D), clips, or any combination thereof (See zipper/snap combination 104E1 and 104E2 of FIG. 8E), Any device known or later developed can be used so long as the second partition can be folded, held, housed when the first partition is in use.

The first mounting members together with the first securing members (e.g., means), in one embodiment, hold the first partition taught so that the pet or child cannot slide between the partition and the seat, or the partition and the floor of the vehicle. First partition 2 is secured to the front seats by straps 7A-D and D-rings 6A-D that attach to the pins of headrest 20A and 20B. In addition to the strap and D-ring configurations, any type of first mounting member (e.g., means) can be used so long as the first partition is secured to the seats in the row in front of it, or a top region thereof (e.g, headrest, or headrest rings). Any point of attachment on the front seat can be used to secure the first partition. Examples of points of attachment on the front seat include the headrest, the metal inserts or pins of a headrest that slide into the top of the seat, and the top portion of the seat itself. Additionally, mounting members can be wrapped around the front seat, attached to front seat covers, or attached using a Velcro® fasteners to the back of the front seat. Using these points of attachments, a number of mounting members (e.g., mounting means) can be utilized, as further described herein.

FIGS. 2 and 3 show hooks 8A and 8B, attached to mounting strap 4A and 4B, respectively. Hooks 8A and 8B attach to a mechanism under the same seat to which the first mounting members are attached. See FIG. 2B. Hooks 8A and 8B are examples of some first securing members or first securing means. First securing members are members that allow the first partition to be secured underneath the seat in front of it (e.g., to a mechanism underneath or at a bottom portion of the seat). Any structure or points of attachment under the seat can be used to attach or secure the first securing members. Examples include structures that support the seat, and spring or wiring mechanisms found under the seat generally used for moving the seat back and forth. Additionally, securing members can be wrapped around the bottom portion of a front seat, attach to front seat covers, or attach using a Velcro® fasteners to the back of the front seat. Using these points of attachments, a number of securing members can be utilized, as further described herein.

Figure 4:
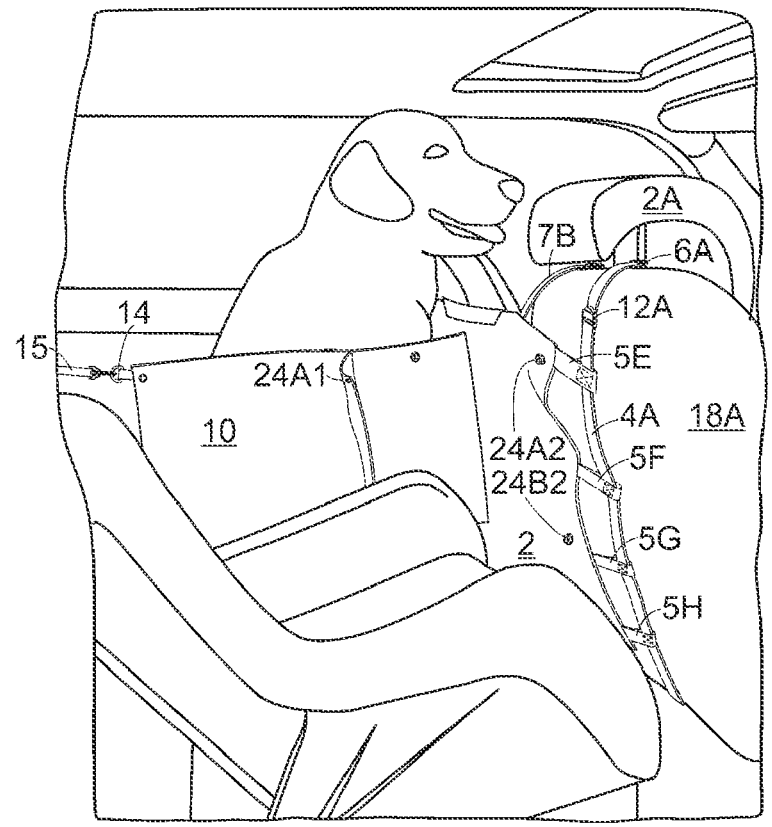
FIG. 4 is a drawing showing, in one embodiment, the first and second partitions of the present invention installed in the back seat of a vehicle.

Referring to FIGS. 4 and 5, second partition 10 separates one seat in the row from an adjoining seat in the same row. FIGS. 4 and 5 show second partition 10 and its attachment to first partition 2 in a particular embodiment. The second partition attaches at an angle to a portion of the first partition. As noted from the figures, second partition 10 attached vertically or lengthwise to about ⅔ of the length of first partition 2. The second partition attaches to the first partition at a length that allows the second partition to avoid interference from the seat, while maintaining a barrier that prevents the child or pet from climbing into the adjoining seat. In an embodiment, the second partition attaches along ¾, ⅔ or ½ or the entire length of the first partition, lengthwise. Second partition 2 can be attached to the midline of first partition, or a bit off center, as shown in FIG. 5. The positioning of the second partition also depends, in some embodiments, on the width of the first partition. The second partition can be positioned at any point, widthwise, along the first partition so long as its position provides room for a pet or child to sit in a seat.

The position of the second partition to the first partition can impact the angle at which they are attached. FIG. 4 shows the apparatus (e.g., the barrier) as installed in a vehicle. When installed, the apparatus, in this embodiment, makes essentially a "T" shape where the top, horizontal portion, of the "T" goes along the back of the front seats, and the vertical portion of the "T" goes between two seats in the back row. This angle is essentially a 90° angle, or is perpendicular. However, if the position of attachment of the second partition is changed, then the angle can be an acute angle (between 1° and 89°) or an oblique angle (between 91° and 180°).

Figure 7A:
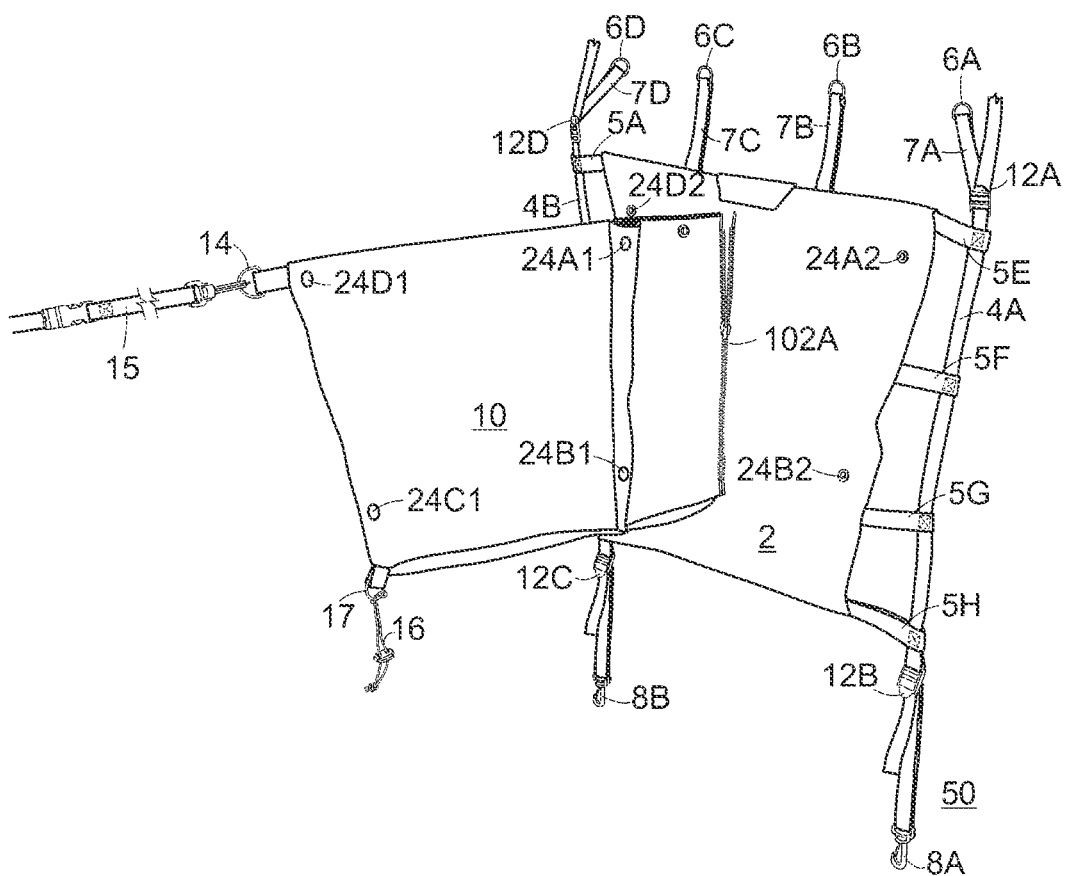
FIGS. 7A-7E are drawings showing a perspective view of the barrier in which the first and second partitions are attached with a zipper (FIG. 7A), a hook & loop arrangement (FIG. 7B), knots (FIG. 7C), lacing (FIG. 7D and a combination thereof (FIG. 7E).
Figure 7B:
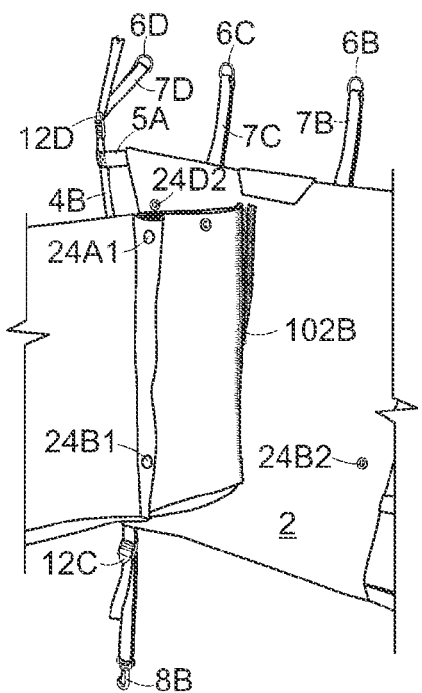
Figure 7C:
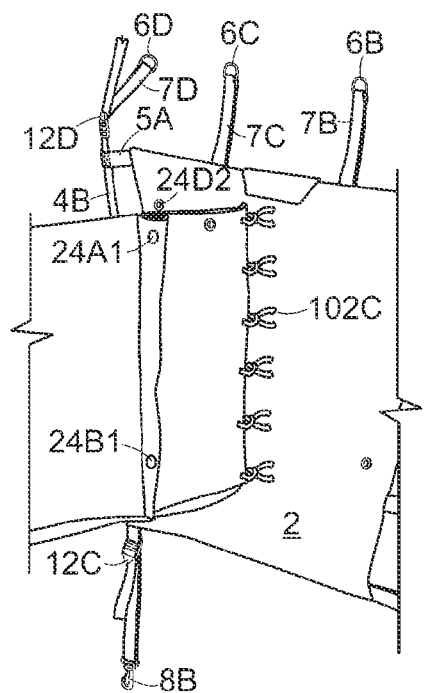
Figure 7D:
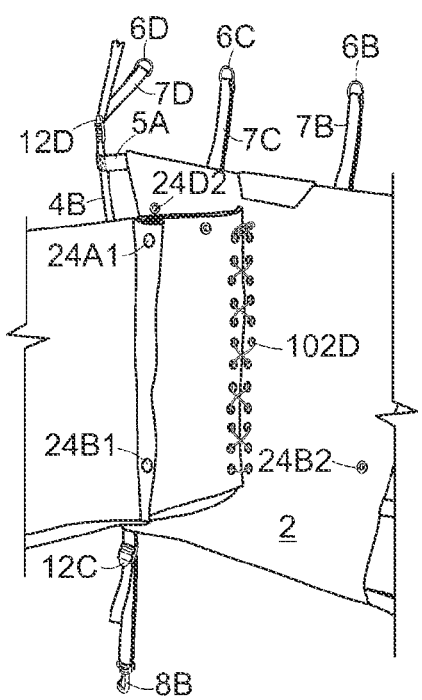
Figure 7E:
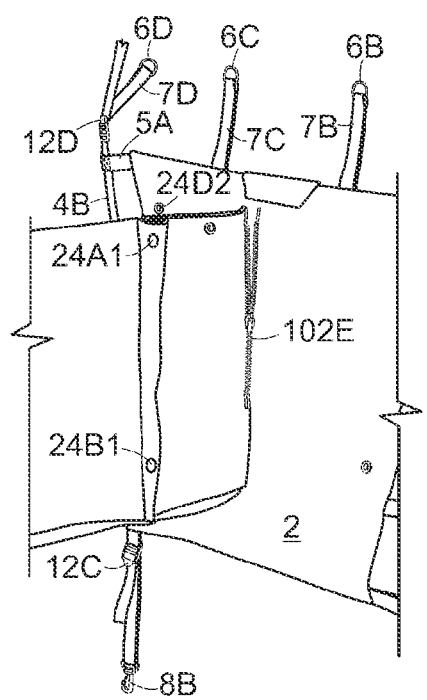

In the embodiment shown in FIGS. 4 and 5, second partition 10 is sewn to first partition 2. However, any means of attaching the first and second partition can be used. Such means for attachment are known in the art and commercially available. Examples of such attachment means include a seam, a ring, a loop, a hook, a snap, a fastener, a strap, a buckle, a trap-lock, a button, a hook, an elastic member, a tie (See ties 102C of FIG. 7C), lace (See lace 102D of FIG. 7D), a clip, a zipper (See zipper 102A of FIG. 7A), a drawstring & cord lock, a hook & hook arrangement, a ring and strap arrangement, a hook & loop arrangement (See hook and loop fastener 102B of FIG. 7B), a plurality thereof, or any combination thereof (See zipper/seem combination 102E of FIG. 7E). Attachment means developed in the future can also be used so long as they serve to attach the first and second partitions to form a barrier to the front seat or adjoining seat.

Figure 10:
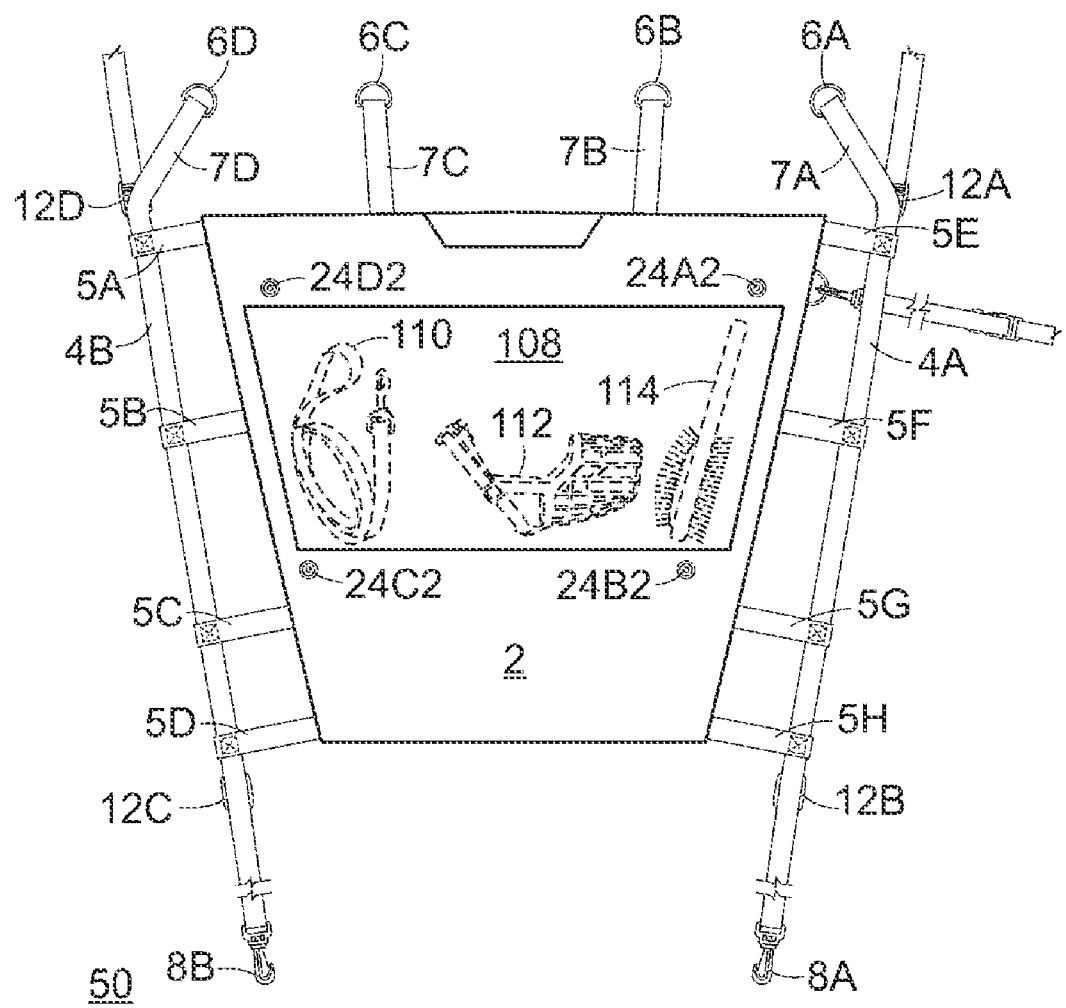
FIG. 10 is a drawing showing the frontal view of an embodiment of the present invention in which the barrier has a pocket for storing pet-related items.

The second partition can optionally have additional one or more flaps to assist with folding or snapping the partition so that it is flush against the first partition. Furthermore, first and second partitions, or any portion of the baffler, may have storage units or pockets (See pocket 108 of FIG. 10) for holding items (e.g., pet related items) such as a leash (See leash 110 of FIG. 10), muzzles (See muzzle 112 of FIG. 10), toys, drink, snacks, grooming items (See pet grooming brush 114 of FIG. 10), trash receptacles, or the like.

The second partition can optionally have additional one or more flaps to assist with folding or snapping the partition so that it is flush against the first partition. Furthermore, first and second partitions, or any portion of the baffler, may have storage units or pockets for holding items (e.g., pet related items) such as a leash, muzzles, toys, drink, snacks, grooming items, trash receptacles, or the like.

Second partition 10, as shown in FIGS. 4 and 5 show D-ring 14, and hook & adjustable strap configuration 15. D-ring 14, acts as a second mounting member, and is inserted into a pin of the headrest in a second row of seats (in the case of a 2-row vehicle, the back row, and in the case of a 3-row vehicle, the second or third row), shown in FIG. 5A1. In another embodiment, the second mounting member includes hook & adjustable strap configuration 15. The hook is attached to D-ring 14 and the adjustable strap is installed around the headrest or both pins of the headrest. See FIG. 5A2. In either embodiment, second partition 10 is secured to the back of the row in which the apparatus is installed. Other points of attachment of the second partition by one or more second mounting members can be used so long as the pet or child cannot slide around or under the partition into the adjoining seat. Examples of attachment points for the seat include the headrest, the metal inserts or pins that slide into the top of the seat, and the top portion of the seat itself. Additionally, the second mounting member can be wrapped around the seat, attach to seat covers, or attach using Velcro® fasteners to the front of the seat. Using these points of attachments, a number of mounting members (e.g., mounting means) can be utilized, as further described herein.

Figure 6A:
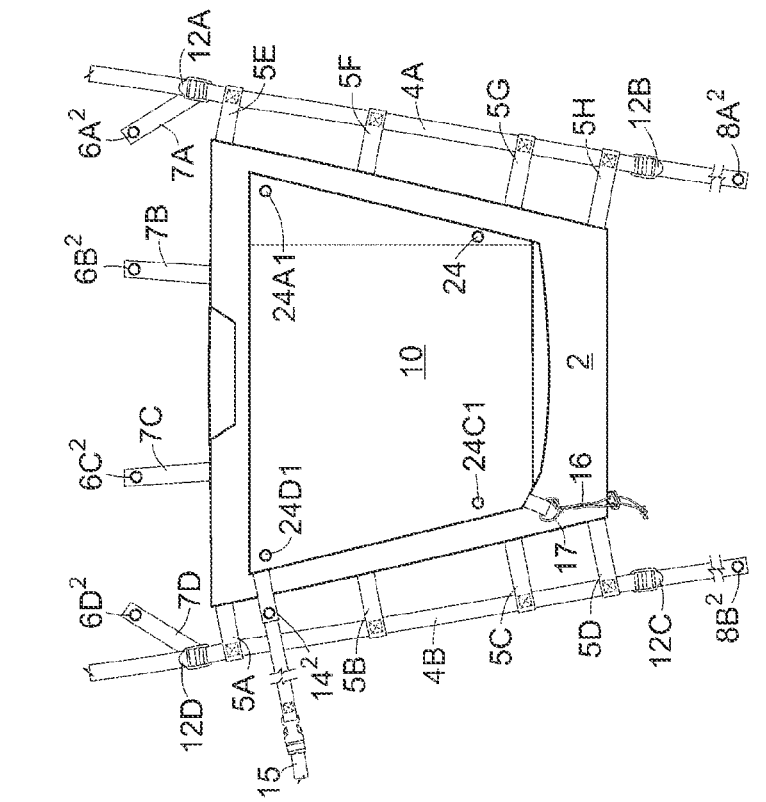
FIGS. 6A-6Q are drawings showing a frontal view an embodiment of the baffler in which the mounting members and securing members are each replaced with a hook (FIG. 6A), snap (FIG. 6B), fastener (FIG. 6C), strap (FIG. 6D), buckle (FIG. 6E), trap-lock (FIG. 6F), button (FIG. 6G), elastic member (FIG. 6H), tie (FIG. 6I), clip (FIG. 6J), zipper (FIG. 6K), drawstring (FIG. 6L), cord lock (FIG. 6M), hook & hook arrangement (FIG. 6N), ring & strap arrangement (FIG. 6O), hook & loop arrangement (FIG. 6P), and a combination thereof (FIG. 6Q).
Figure 6B:
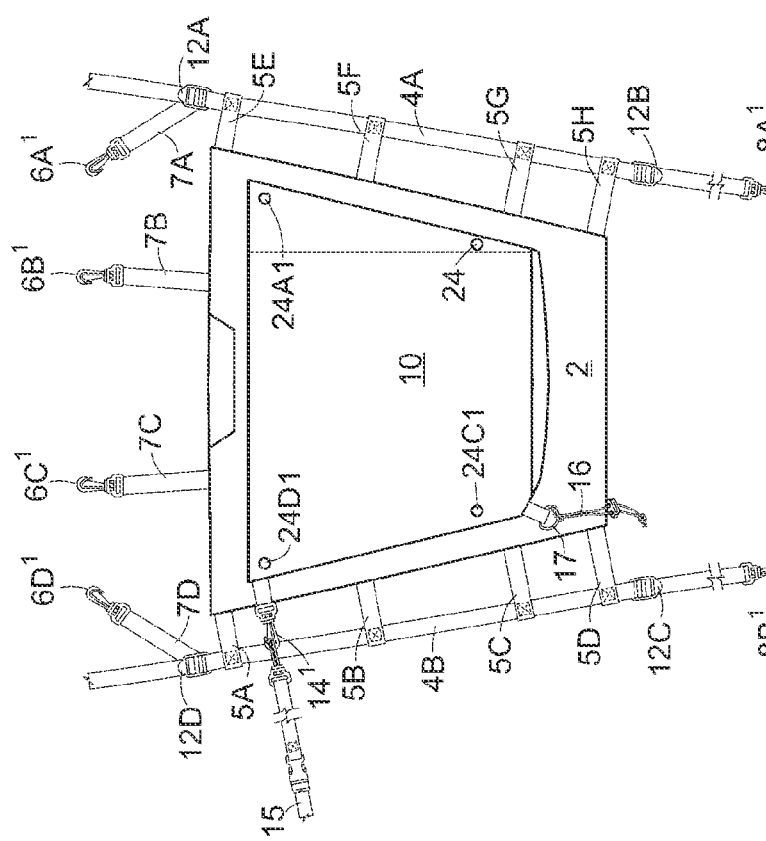
Figure 6C:
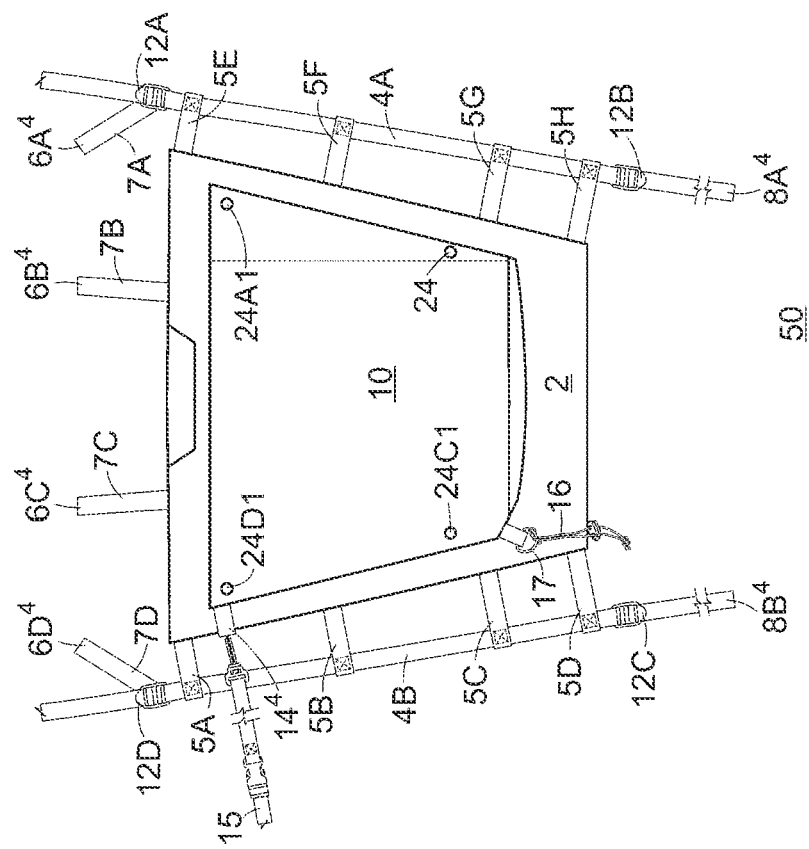
Figure 6D:
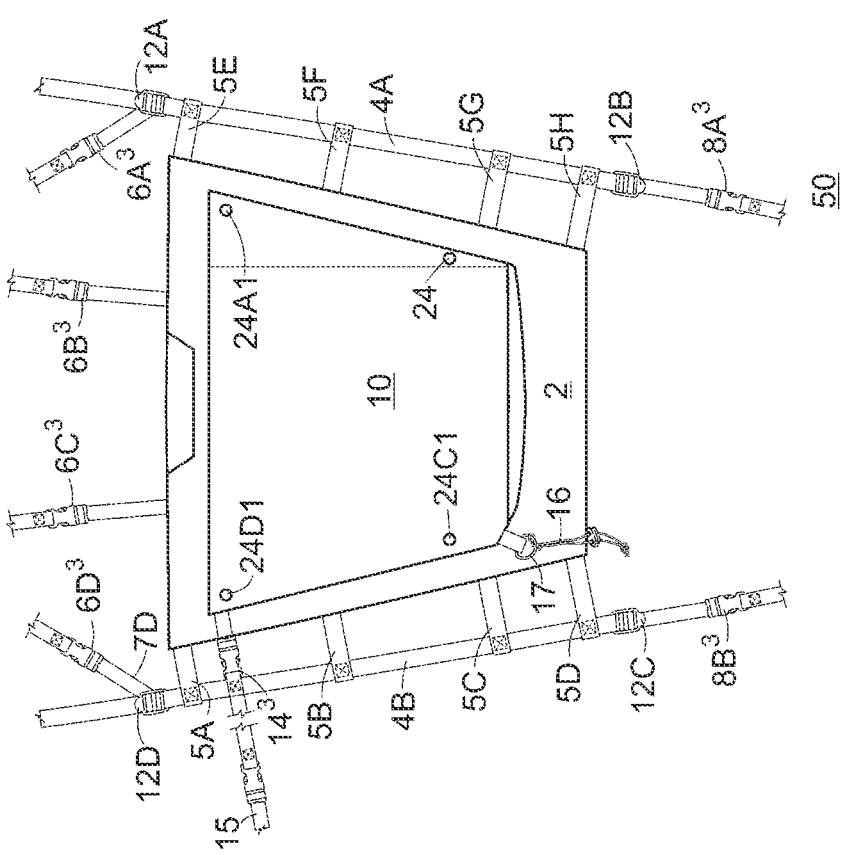
Figure 6F:
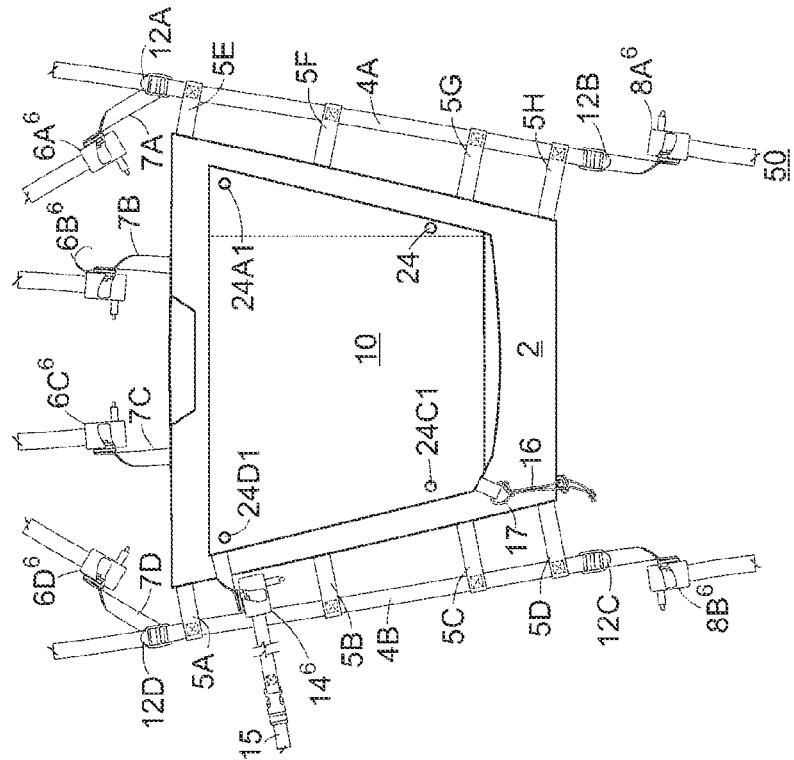
Figure 6E:
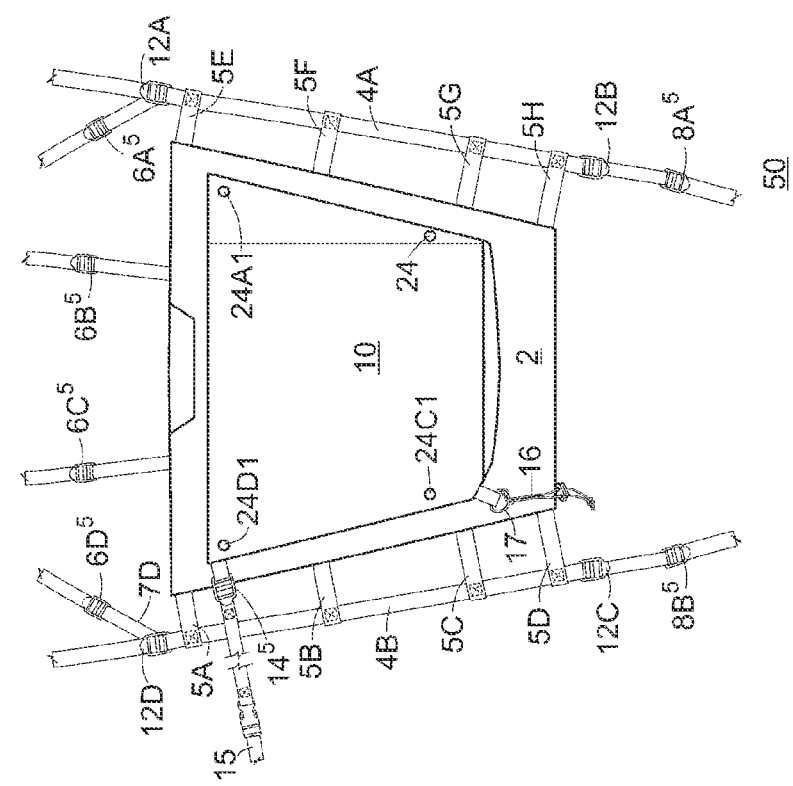
Figure 6G:
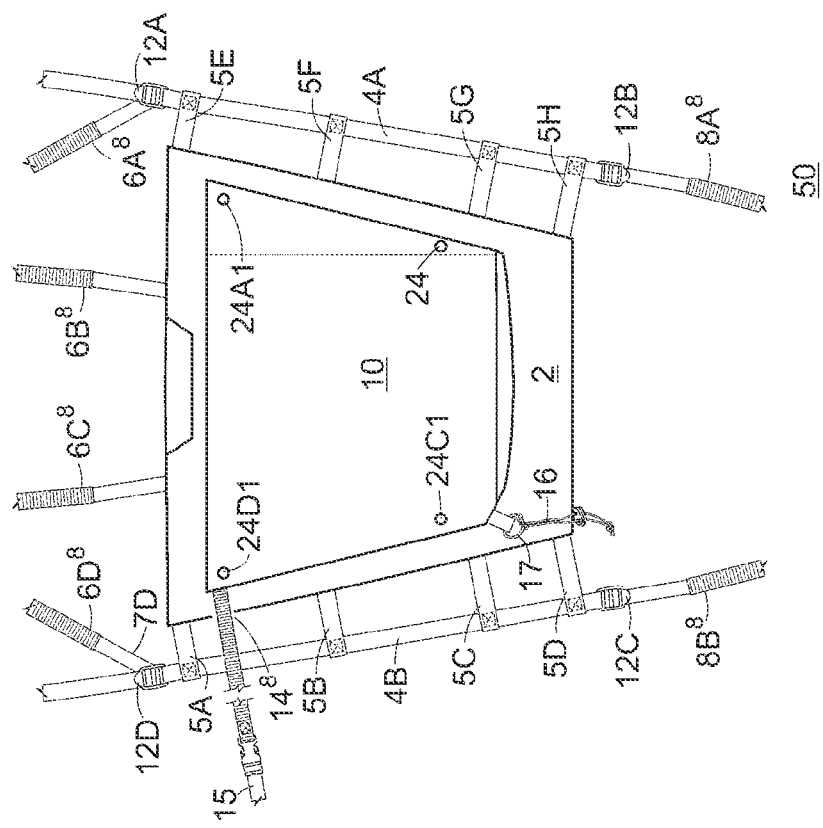
Figure 6H:
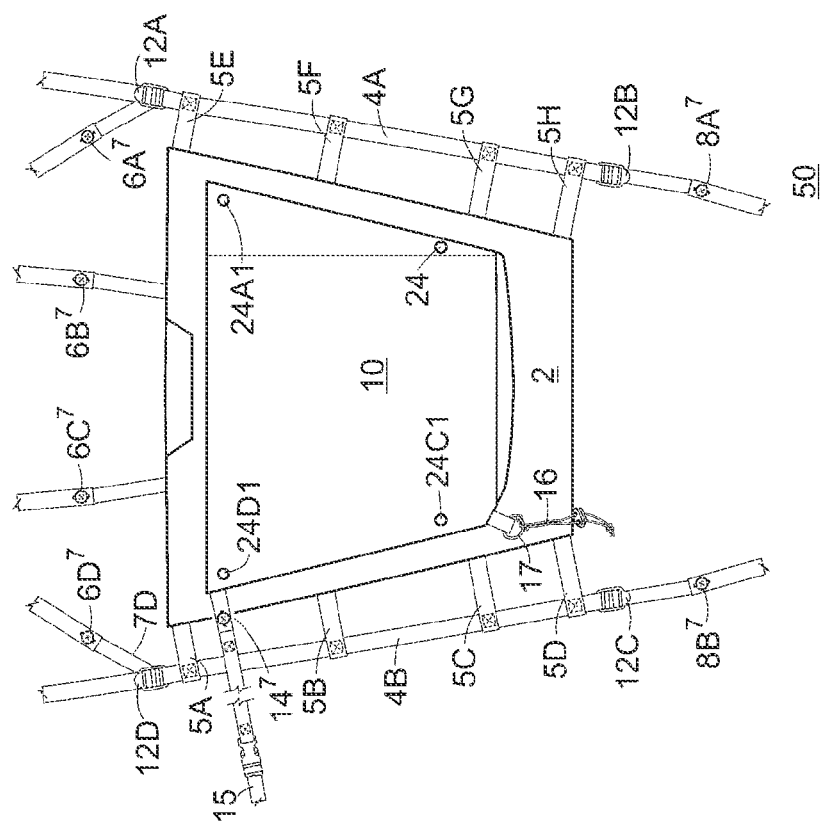
Figure 6L:
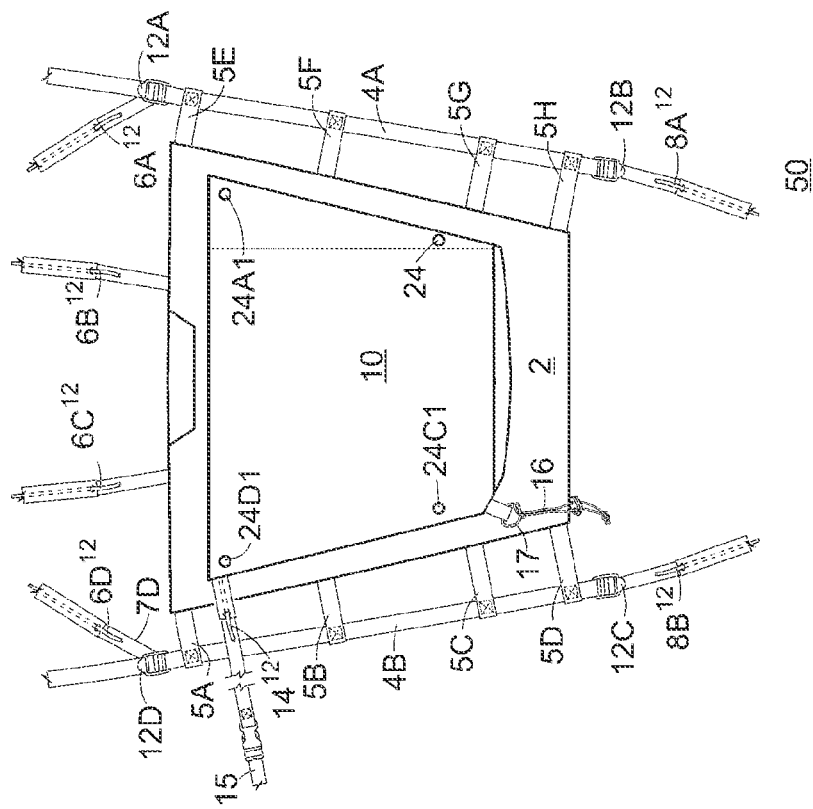
Figure 6K:
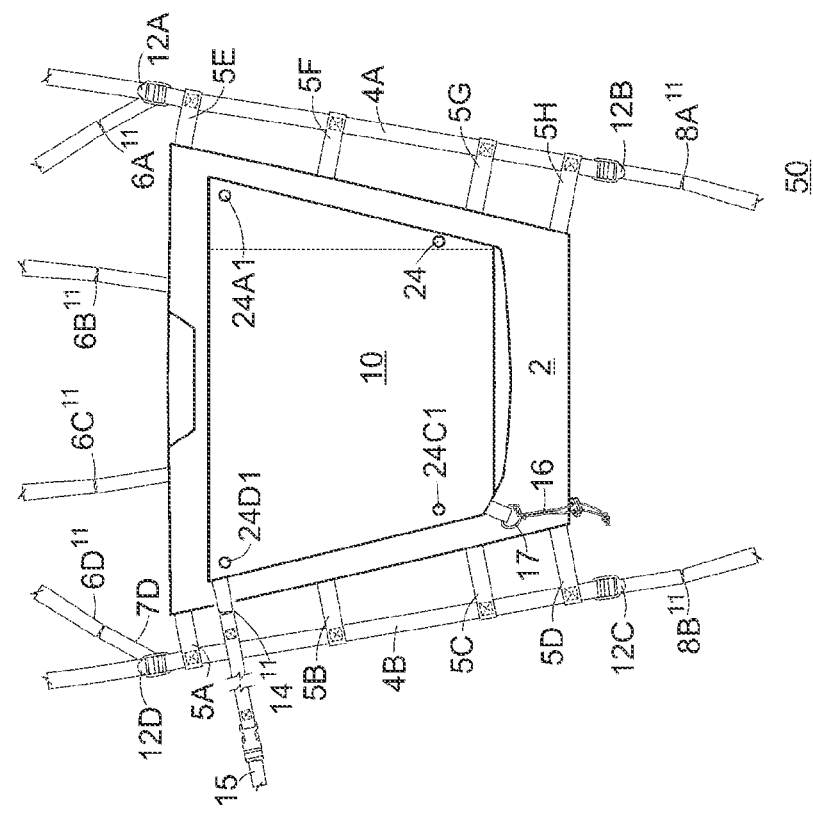
Figure 6P:
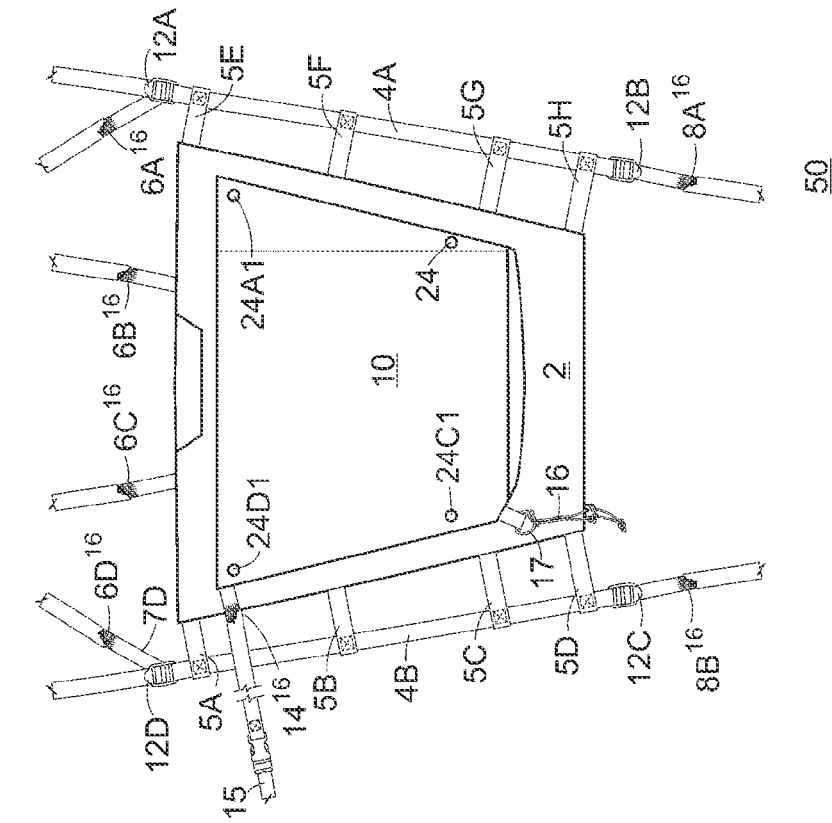
Figure 6O:
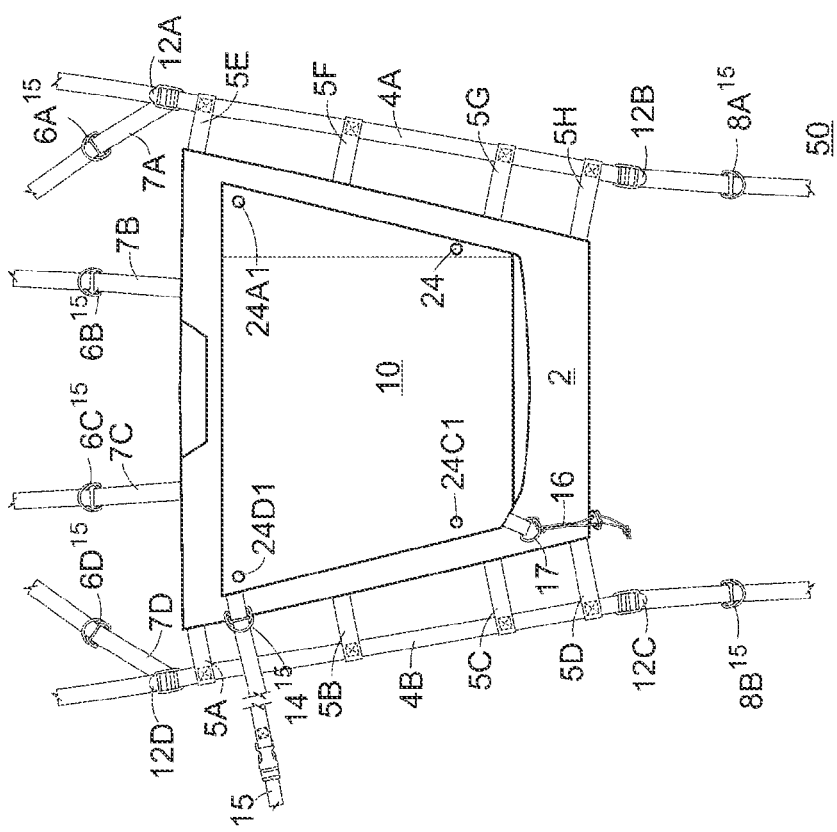
Figure 6Q:
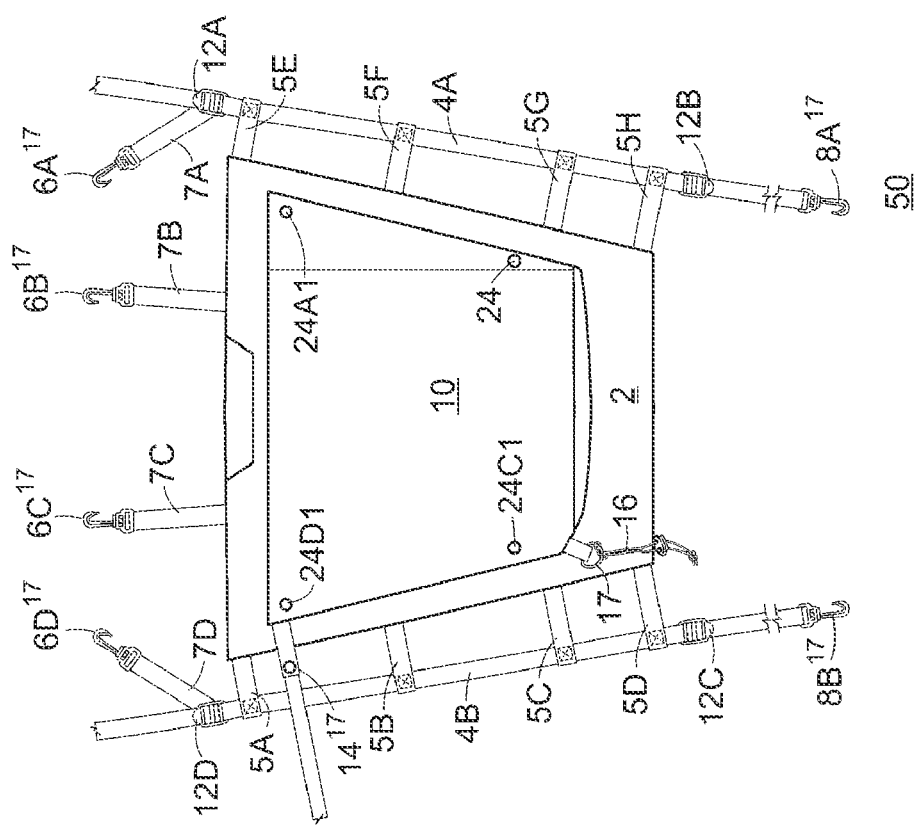

Any number of mounting members (e.g., one or more first and/or second mounting members) that mount either the first partition, the second partition or both, can be used to install the barrier. Mounting members of the present invention complement their respective points of attachment, as described herein. Examples of mounting members that can be used include, e.g., a ring (e.g., a D ring), a ring and strap arrangement (See ring/strap member $6A^{15}$-$6D^{15}$ and $8A^{15}$-$8B^{15}$ of FIG. 6O), a loop, a hook (See hooks $6A^1$-$6D^1$ and $8A^1$-$8B^1$ of FIG. 6A), a snap (See snaps $6A^2$-$6D^2$ and $8A^2$-$8B^2$ of FIG. 6B), a fastener (See fasteners $6A^3$-$6D^3$ and $8A^3$-$8B^3$ of FIG. 6C), a strap (See straps $6A^4$-$6D^4$ and $8A^4$-$8B^4$ of FIG. 6D), a buckle (See buckles $6A^5$-$6D^5$ and $8A^5$-$8B^5$ of FIG. 6E), a trap-lock (See trap lock $6A^6$-$6D^6$ and $8A^6$-$8B^6$ of FIG. 6F), a button (See buttons $6A^7$-$6D^7$ and $8A^7$-$8B^7$ of FIG. 6G), an elastic member (See elastic member $6A^8$-$6D^8$ and $8A^8$-$8B^8$ of FIG. 6H), a tie (See ties $6A^9$-$6D^9$ and $8A^9$-$8B^9$ of FIG. 6I), a clip (See clips $6A^{10}$-$6D^{10}$ and $8A^{10}$-$8B^{10}$ of FIG. 6J), a zipper (See zipper $6A^{11}$-$6D^{11}$ and $8A^{11}$-$8B^{11}$ of FIG. 6K), a drawstring (See drawstring $6A^{12}$-$6D^{12}$ and $8A^{12}$-$8B^{12}$ of FIG. 6L), & cord lock (See cord lock $6A^{13}$-$6D^{13}$ and $8A^{13}$-$8B^{13}$ of FIG. 6M), a hook & hook arrangement (See hook & hook member $6A^{14}$-$6D^{14}$ and $8A^{14}$-$8B^{14}$ of FIG. 6N), a hook & loop/strap arrangement (See hook & loop member $6A^{16}$-$6D^{16}$ and $8A^{16}$-$8B^{16}$ of FIG. 6P), and a combination thereof (See hook members $6A^{17}$-$6D^{17}$ and $8A^{17}$-$8B^{17}$ combined with snap $14^{17}$ of FIG. 6Q). Such mounting members are commercially available and can be obtained from a hardware store, home supply stores, or in particular, National Molding Corp. (Farmingdale, NY). Mounting members that are now known or developed in the future can also be used so long as the members when used to install the partitions prevent a pet or child from climbing over or under it.

More than one mounting member can be employed to secure the first partition to the front row of seats, or attach the second partition to the back row of seats. The embodiment shown in FIGS. 1, 2, and 2A was made with 4 first mounting members, e.g., straps 7A-D and D-rings 6A-D, engaged the pins of headrest 20A and B. FIG. 5A1 shows second mounting member, D-ring 14, mounted to the pins of headrest of a second row of seats in a vehicle. The mounting members, in an embodiment, removably attach or secure the partitions described herein.

Figure 5C:
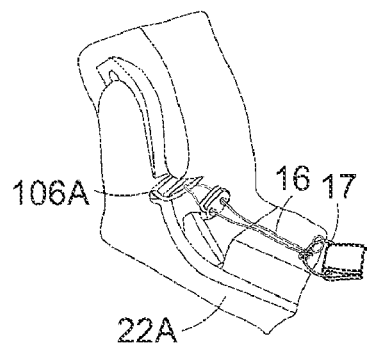
FIG. 5C is a drawing showing an embodiment of a second securing member being mounted to a child safety latch.
Figure 5D:
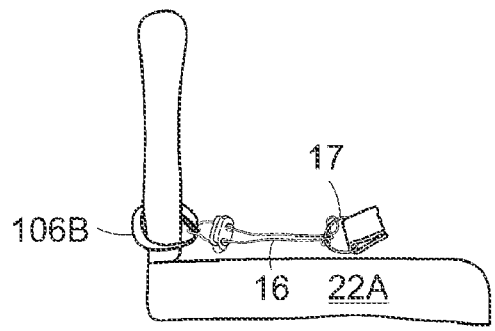
FIG. 5D is a drawing showing an embodiment of a second securing member being mounted to a hook & loop fastener.
Figure 5E:
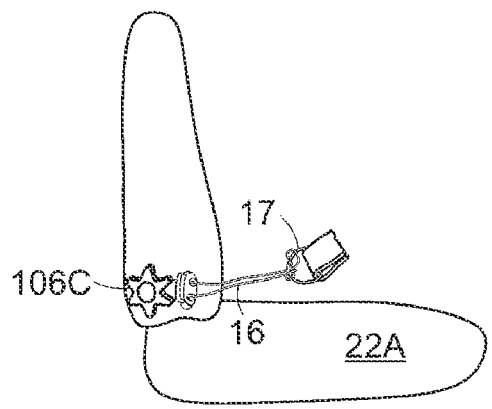
FIG. 5E is a drawing showing an embodiment of a second securing member being mounted to a seat release knob.
Figure 5F:
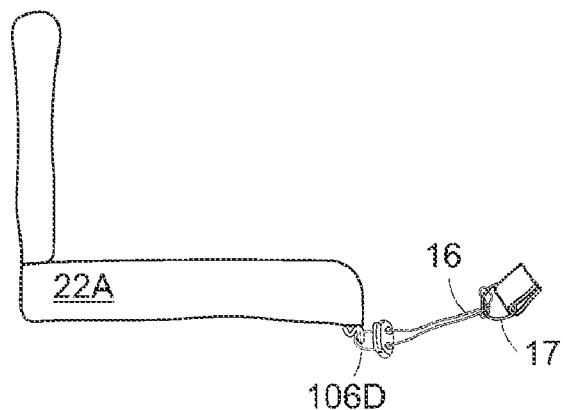
FIG. 5F is a drawing showing an embodiment of a second securing member being mounted to a pressure mounted bar.

In addition to mounting members, one or more securing members are used to secure the first and/or second partitions. FIG. 5 shows drawstring & cord lock arrangement 16, attached to second partition 10 via a D-ring 17. Drawstring & cord lock arrangement 16 is placed around the seatbelt stem and tightened during installation. FIG. 5B. Any structure on the back seat can be used as a point of attachment so long as the lower portion of the second partition is secured to thereby prevent a pet or child from sliding underneath the partition into an adjoining seat. In another embodiment, an attachment point for the second securing member can be a child safety latch 106A and structures related thereto (See FIG. 5C). The second securing member can be mounted directly or indirectly to a child safety latch with a hook and/or strap arrangement, or a configuration thereof. Examples of other attachment points for the second securing member include seatbelt buckle, child safety latch system, hook & loop fasteners 106B (FIG. 5D), the seat release knob 106C (FIG. 5E), pressure mount bar 106D (FIG. 5F) or a child safety seat in an adjoining seat. Additionally, securing members can be wrapped around the back seat, attached to back seat covers, or attach using a Velcro® fasteners to the front of the back seat.

Using these points of attachments, a number of securing members can be utilized. In attaching second partition 10, FIG. 4 and 5 illustrate the use of drawstring & cord lock arrangement 16 (attached to second partition 10 via a D-ring 17) to be wrapped around and secured to seat belt stem 19. For securing first partition 2, hooks 8A and 8B are used for attachment to a structure under the front seat. Examples of securing members that can be used with the present invention include, e.g., a ring (e.g., a D ring), a ring and strap arrangement (See ring/strap member $14^{15}$ of FIG. 6O), a loop, a hook, (See hook $14^1$ of FIG. 6A), a snap (See snap $14^2$ of FIG. 6B), a fastener (See fastener $14^3$ of FIG. 6C), a strap (See strap $14^4$ of FIG. 6D), a buckle (See buckle $14^5$ of FIG. 6E), a trap-lock (See trap-lock $14^6$ of FIG. 6F), a button (See button $14^7$ of FIG. 6G), an elastic member (See elastic member $14^8$ of FIG. 6H), a tie (See tie $14^9$ of FIG. 6I), a clip (See clip $14^{10}$ of FIG. 6J), a zipper (See zipper $14^{11}$ of FIG. 6K), a drawstring (See drawstring $14^{12}$ of FIG. 6L), cord lock (See cord lock $14^{12}$ of FIG. 6M), the male side of a seat belt, a hook & hook arrangement (See hook $14^{14}$ of FIG. 6N), a hook & loop/strap arrangement (See hook and loop fastener $14^{16}$ of FIG. 6P) and a combination thereof (See hook members 6A17-6D17 combined with snap $14^{17}$ of FIG. 6Q). Such securing members can be obtained from a hardware store or home supply stores. Securing members (e.g., securing means) that are known or developed in the future can also be used so long as the means allow the first or second partition to block a pet or child from going under the partitions. More than one securing member can be employed to secure the partitions. Furthermore, attachment of the mounting and securing members, in an embodiment, is removable or reversible.

As used herein, a back seat is defined as a second, third or fourth row of seats in a vehicle, and front seat is defined herein as the row of seats in front of the row that the apparatus of the present invention is being installed. For examples, in a sport utility vehicle that has three rows of seats, the apparatus of the present invention could be installed in the second row or third row of seats. In the case in which the partitioning apparatus is installed in the third row of seats, the second row acts as the "front row" of seats for installing the apparatus.

Additionally, the present invention universally fits different types of vehicles (e.g., cars, trucks, station wagons, etc.), and vehicles of different sizes (e.g., from compact cars to Chevrolet Suburbans). The universal fit is accomplished with mounting strap system, and the types of mounting and securing members utilized. Members that can be adjusted (e.g., tightened or loosened) to allow the present invention to be installed universally in many types of vehicles. In one embodiment, there can be two or more versions, one made for cars and trucks, and another made for vans.

The present invention further relates to vehicles, systems and kits that include the apparatus of the present invention and parts thereof. For example, the present invention pertains to a vehicle having two or more rows of seats, and the apparatus described herein. Additionally, the invention includes a system that has a vehicle along with the apparatus.

The kits of the present invention can include the apparatus described herein, or parts of the apparatus that are put together to form the apparatus described herein. For example, the apparatus includes a first partition, a second partition, one or more mounting members and one or more securing members. These items or a combination thereof can be provided in a kit and are put together to form the barrier described herein. In addition, the kit can include pet or child related items such as toys, snacks, drink holders, grooming items and the like.

The present invention relates to methods of installing the apparatus, and methods of using the apparatus. Methods of installing the apparatus include mounting the first partition to the first row of seats (e.g., a front row) or top region thereof using the first mounting members described herein. For example, when installing the barrier shown in FIGS. 2 and 5, the user secures first partition 2 with D-rings 6A-6D to the pins of headrests of both seats in the first row. The user also secures the second mounting member, such as D-ring 14 to the pins of headrest in the second row. The methods also encompass securing the securing members of the first and second partitions. A first securing member can be attached to a structure or mechanism under the first row of seats, as described herein. In the embodiment shown in FIGS. 2B and 5, hooks 8A and 8B are attached to the spring used to move the seat position and located generally underneath the seats. A second securing member can be attached to a structure or mechanism of the second row of seats. The user can also attach the second securing member, such as drawstring and cord lock configuration 16 to the seatbelt stem.

The present invention also relates to methods for separating a pet or child in a seat of a vehicle from an adjoining seat, or in the row ahead of it. The method involves placing or securing the pet or child in the seat for which the apparatus described herein has been installed. When the pet or child is placed or secured in the seat, the partition prevents them from climbing into the adjoining seat, or from going into the row ahead of it.

Exemplification

The barrier shown in FIGS. 1-5 was constructed and installed into various vehicles as follows. The non-adjustable portion of the first partition was made from a ballistic nylon and cut 26" across the top, 23" along the sides and 16" across the bottom, edged with a 0.5" seam. All materials for the development of this product were purchased from Quest Outfitters, http://www.questoutfitters.com/, 4919 Hubner Circle, Sarasota, Fla. 34241. The mounting system or set of straps, sewn to the first partition, was made from a plurality of elastic members and straps. Specifically, 2 sets of elastics pieces measuring 1" by 7", 8", 10, and 11" were used. These elastic pieces were folded in half and the folded side of each of the pieces was sewn to the left and right sides of the first partition, when viewing the partition as mounted to the back of a front seat of a vehicle. They were space apart evenly going from the smaller size to the larger size progressing from top to bottom, as shown in FIG. 2. The other end of the elastic pieces was sewn to a strap (webbing) measuring 65" by 0.75". This was repeated on the other side. The strap was positioned essentially vertically, and has an adjustable buckle on either end. The strap was created long enough to span the area of an integrated head rest. The top end of the strap also has a D-ring for attachment to a pin of a headrest, and the lower end of the strap has a hook for attachment to a structure under the seat. At the top of the first partition, two additional 9.5" elastic pieces, also folded in half, were sewn to the partition at the folded end. D-rings were attached to the other end of the elastic pieces for mounting to the headrest pins. Ultra suede material was attached for decorative purposes. Snaps were also attached so that the second partition can be snapped to the first partition and be flush against it while the first partition is in use, as shown in FIG. 2.

The second partition was cut from the same ballistic nylon as in the first partition as follows:

top—16" and again at an angle of 33.5° at 22.5"
bottom—8.25" and again at an angle of 26° at 16"
side attached to the first partition—14.75"
other side—16.5"

The second partition was edged with a 0.5" seam. The 14.75" side was sewn vertically to the first partition starting about 1" left of the midline of first partition, and 1.25" from the top of the partition. Two elastic pieces measuring 1" by 4" were attached to the other 16.5" side at the top and bottom. A D-ring was attached to the top elastic piece for attachment to the headrest pin, and a D-ring with drawstring and cord lock was attached to the bottom elastic piece for attachment to the seatbelt stem. The second partition was pinched and sewn from top to bottom at the angle, providing a flap with snaps for attaching to the fist partition when the user wishes to tuck or fold the second partition out of the way.

The barrier was installed into a vehicle by attaching the four D-rings of the first partition to the four headrest pins in the seats in front of the seat to which the barrier is being installed. The hooks of the first partition were attached to springs under the same seats. The D-ring of the second partition was secured to a pin of a headrest of the seat that is being partitioned or separated, and the drawstring and cord lock was attached to a seatbelt stem of the seat being separated. The straps were tightened. The user moved the front seat and passenger seats to various seat positions and the integrity of the barrier was maintained. A pet was placed in the seat having the partition installed thereto, and the pet was prevented from climbing under or over the partition to get to either the adjoining seat or the row of seats in ahead of it.

The barrier was installed in various types of vehicles, including a 1995 Subaru Legacy wagon, 2001 Subaru Legacy wagon, 2001 Audi A6 Avant, 1999 Saab 93, and a 1999 Volvo XC70 wagon. The barrier fit each of these vehicles and prevented a pet from moving into the adjoining seat or a seat in the row ahead of it.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for partitioning seats in a vehicle, said apparatus comprises:
    a. a first partition for separating a second row from a first row of seats in the vehicle;
    b. at least one first mounting member for mounting the first partition to the first row of seats or a top region thereof, wherein the first partition has the first mounting member;
    c. a second partition for separating a first seat in the second row from a second seat in the second row, wherein the second partition attaches at an angle to a portion of the first partition;
    d. at least one second mounting member for mounting the second partition to the second row of seats or a top region thereof, wherein the second partition has the second mounting member, wherein the first mounting member, the second mounting member, or both are adjustable or flexible; and
    e. one or more first securing members for securing the first partition under the first row of seats.

2. The apparatus of claim 1, wherein the apparatus includes one or more materials that comprise elastic material, a spandex material, a spring, a pulley, a blend thereof, or combinations thereof.

3. The apparatus of claim 1, wherein the first mounting member, the second mounting member, or both is selected from the group consisting of: a ring, a loop, a snap, a fastener, a strap, a buckle, a trap-lock, a button, a hook, an elastic member, a tie, a clip, a zipper, a drawstring & cord lock, a hook & hook arrangement, a ring and strap arrangement, and a hook & loop arrangement.

4. The apparatus of claim 3, wherein the first mounting member further comprises a member that is secured to a pin of a headrest in the first row of seats, and the second mounting member further comprises a member that is secured to a pin of a headrest in the second row of seats, or wrapped around the headrest.

5. The apparatus of claim 1, wherein the apparatus further comprises one or more second securing members for securing the second partition to a seat belt stem, child safety latch, hook and loop fastener over the back of a seat, seat release knob, or pressure mounted bar in or behind the second row of seats.

6. The apparatus of claim 5, wherein the first securing member, the second securing member, or both are selected from the group consisting of: a ring, a loop, a snap, a fastener, a strap, a buckle, a trap-lock, a button, a hook, an elastic member, a tie, a clip, a zipper, a drawstring & cord lock, a hook & hook arrangement, a ring and strap arrangement, and a hook & loop arrangement.

7. The apparatus of claim 5, wherein the second partition attaches to a portion of the first partition with a seam, snaps, zipper, fasteners, hooks & loop arrangement, knot, and lacing.

8. A vehicle that comprises:
    a. at least two rows of seats; and
    b. the apparatus of claim 1.

9. An apparatus for partitioning seats in a vehicle, said apparatus comprises:
    a. a first partition for separating a second row from a first row of seats in the vehicle;
    b. at least one mounting strap having a first end and a second end, wherein at least one side of the first partition has said mounting strap;
    c. at least one first mounting member for mounting the first partition to the first row of seats or a top region thereof, wherein the first end of the mounting strap has said first mounting member;
    d. a second partition for separating a first seat in the second row from a second seat in the second row, wherein the second partition attaches at an angle to a portion of the first partition; and
    e. at least one second mounting member for mounting the second partition to the second row of seats or a top region thereof, wherein the second end of the mounting strap has the second mounting member.

10. An apparatus for partitioning seats in a vehicle, said apparatus comprises:
    a. a first partition for separating a second row from a first row of seats in the vehicle;
    b. two or more strap and ring arrangements, wherein a top region of the first partition has said two or more strap and ring arrangements;
    c. a second partition for separating a first seat in the second row from a second seat in the second row, wherein the second partition attaches at an angle to a portion of the first partition;
    d. a second strap and ring arrangement, wherein a top region of the second partition has the second strap and ring arrangement;
    e. two or more hook and strap arrangements, wherein a bottom region of the first partition has said two or more hook and strap arrangements; and
    f. a drawstring and cord lock arrangement, or a hook, wherein a bottom region of the second partition has the drawstring and cord lock arrangement, a male side of a seat belt, or the hook.

11. The apparatus of claim 10, wherein the apparatus further comprises a device for housing, or folding back the second partition.

12. The apparatus of claim 11, wherein the device for housing or folding back the second partition includes snaps, pocket, zipper, fasteners, hooks & loop arrangement, a fastener, a buckle, a button, a tie, and a clip.

13. A method for use in a vehicle having a first row of seats and a second row of seats, for separating a first seat in the second row of a vehicle from a second seat in the second row, the method comprises securing an apparatus for partitioning seats, said apparatus comprises:
    a. a first partition for separating the second row from the first row of seats in the vehicle;

b. at least one first mounting member for mounting the first partition to the first row of seats or a top region thereof, wherein the first partition has the first mounting member;
c. a second partition for separating the first seat in the second row from the second seat in the second row, wherein the second partition attaches at an angle to a portion of the first partition; and
d. at least one second mounting member for mounting the second partition to the second row of seats or a top region thereof, wherein the second partition has the second mounting member;

wherein the apparatus includes one or more materials that allow for the adaptation or adjustment of the length or width of the apparatus, and wherein the first seat is separated from the second seat in the second row and wherein the first mounting member, the second mounting member, or both are adjustable or flexible.

14. A method for installing the apparatus of claim 13, said method comprises
a. mounting the first partition to the first row of seats or a top region thereof using said first mounting member; and
b. mounting the second partition with the second mounting member to the second row of seats or a top region thereof.

15. The method of claim 14, wherein the apparatus further comprises one or more first securing members for securing the first partition under the first row of seats, and the method further comprises securing said first securing member under the first row of seats.

16. A vehicle partitioning system, comprising:
a. a vehicle having a first row of seats and a second row having a first seat and a second seat; and
b. an apparatus for partitioning the first seat from the second seat in the second row in a vehicle, the apparatus comprises:
  i. a first partition for separating the second row from the first row of seats in the vehicle;
  ii. at least one first mounting member for mounting the first partition to the first row of seats or a top region thereof, wherein the first partition has the first mounting member;
  iii. a second partition for separating the first seat in the second row from the second seat in the second row, wherein the second partition attaches at an angle to a portion of the first partition; and
  iv. at least one second mounting member for mounting the second partition to the second row of seats or a top region thereof, wherein the second partition has the second mounting member wherein the first mounting member, the second mounting member, or both are adjustable or flexible.

17. A kit for partitioning seats in a vehicle, the kit comprising:
  i. a first partition for separating a second row from a first row of seats in the vehicle;
  ii. at least one first mounting member for mounting the first partition to the first row of seats or a top region thereof, wherein the first partition has the first mounting member;
  iii. a second partition for separating a first seat in the second row from a second seat in the second row, wherein the second partition attaches at an angle to a portion of the first partition; and
  iv. at least one second mounting member for mounting the second partition to the second row of seats or a top region thereof, wherein the second partition has the second mounting member wherein the first mounting member, the second mounting member, or both are adjustable or flexible.

* * * * *